Aug. 20, 1946.   G. A. LOCKE   2,406,023
TELETYPEWRITER SIGNAL ENCIPHERING SYSTEM
Filed March 25, 1944   15 Sheets-Sheet 1
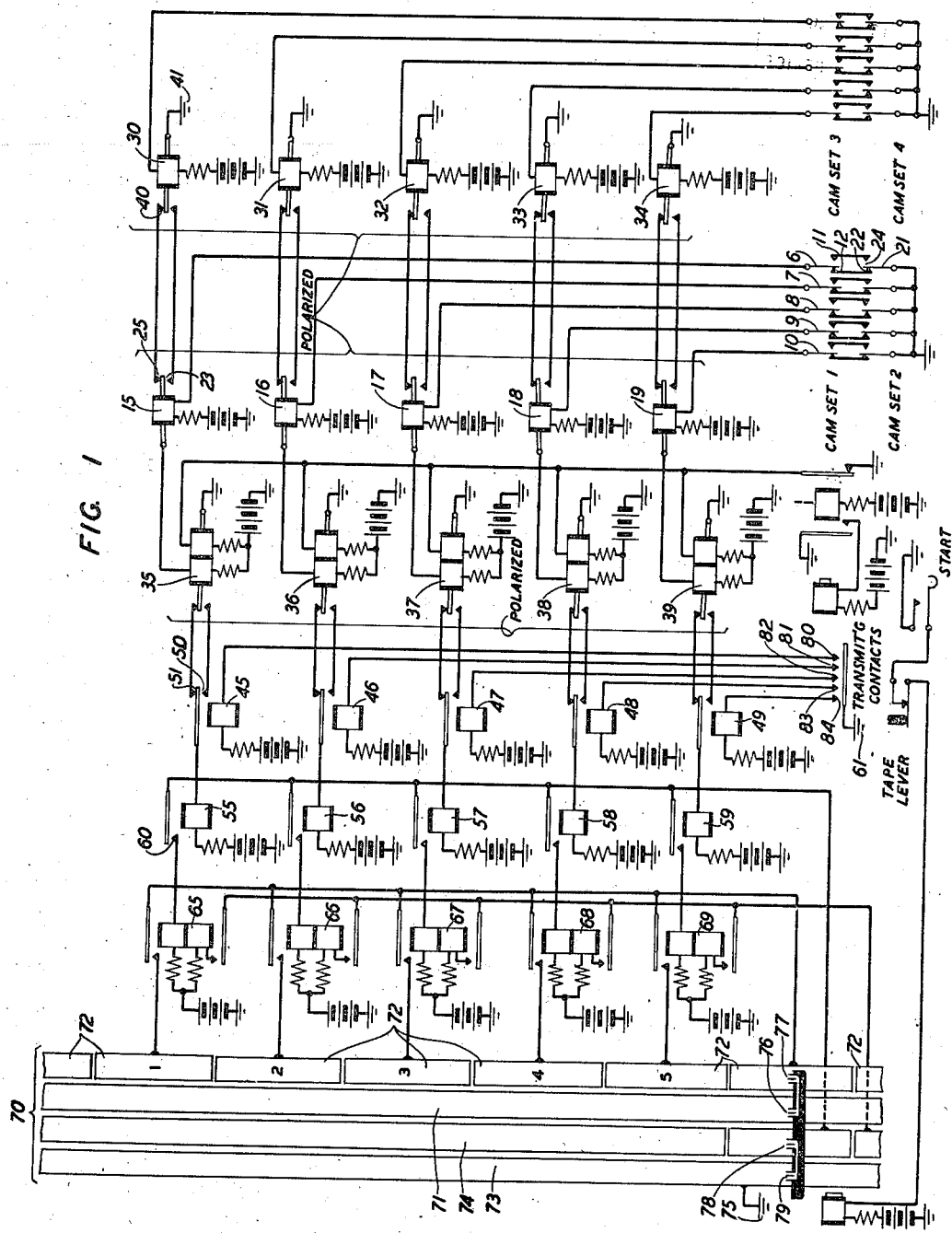
INVENTOR
G. A. LOCKE
BY John E. Cassidy
ATTORNEY Aug. 20, 1946.  G. A. LOCKE  2,406,023
TELETYPEWRITER SIGNAL ENCIPHERING SYSTEM
Filed March 25, 1944  15 Sheets-Sheet 2
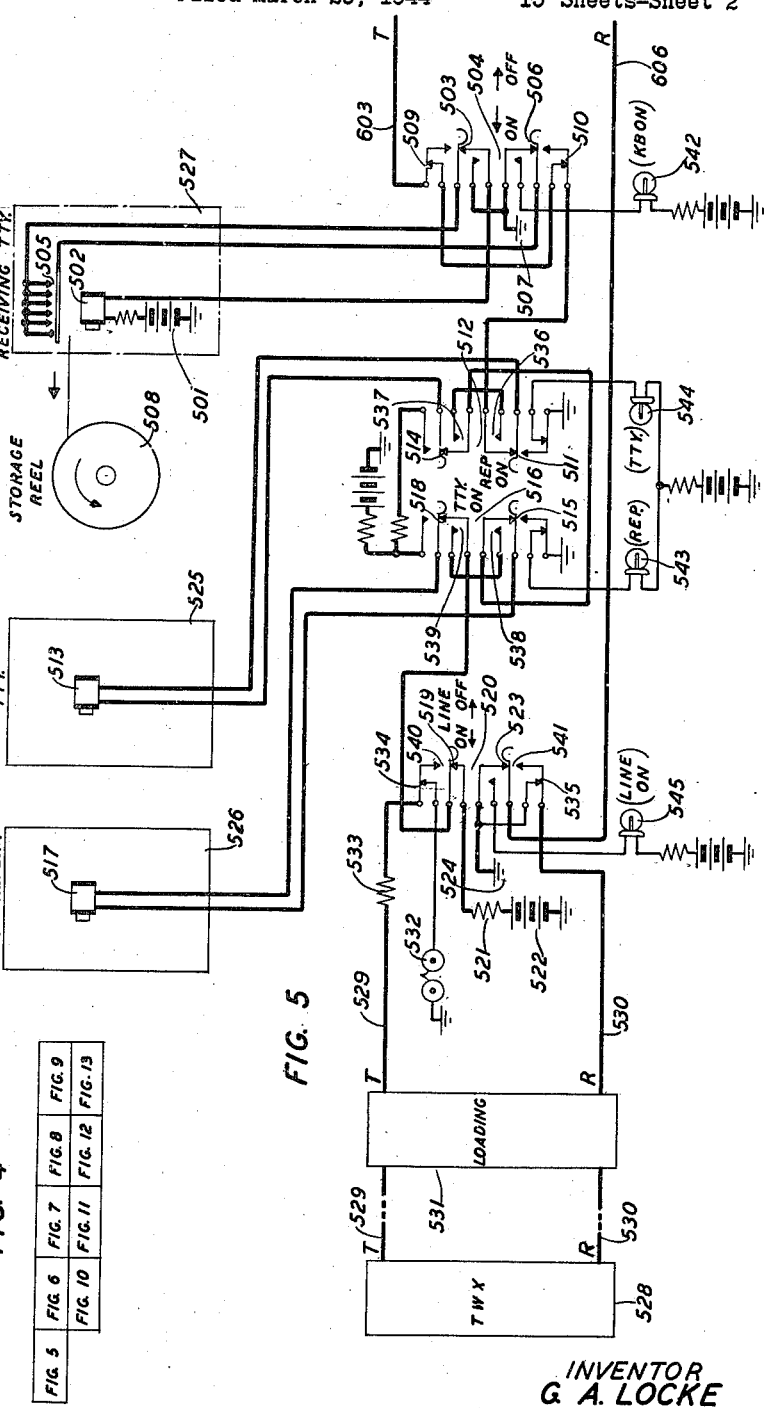
INVENTOR
G. A. LOCKE
BY John E. Cassidy
ATTORNEY

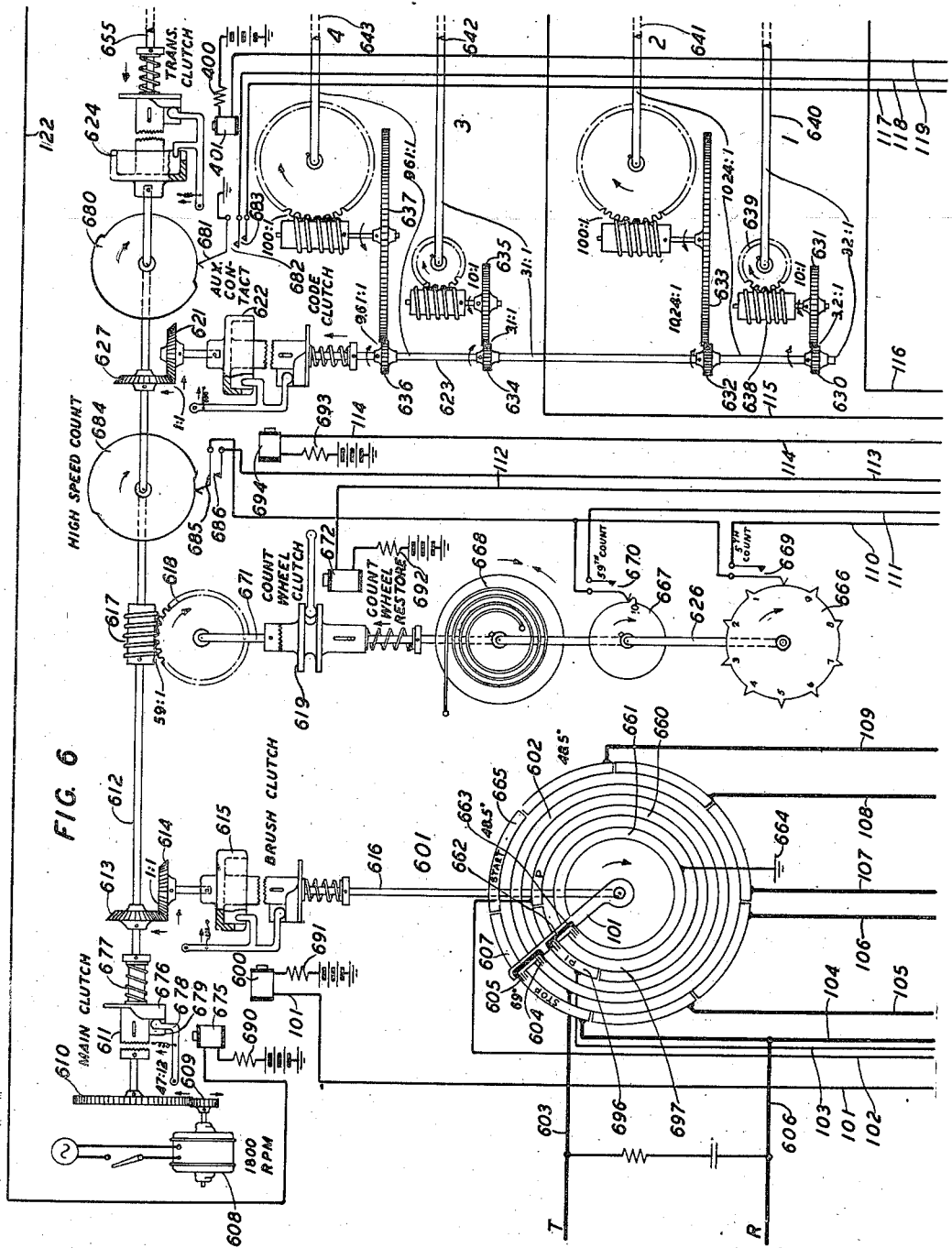

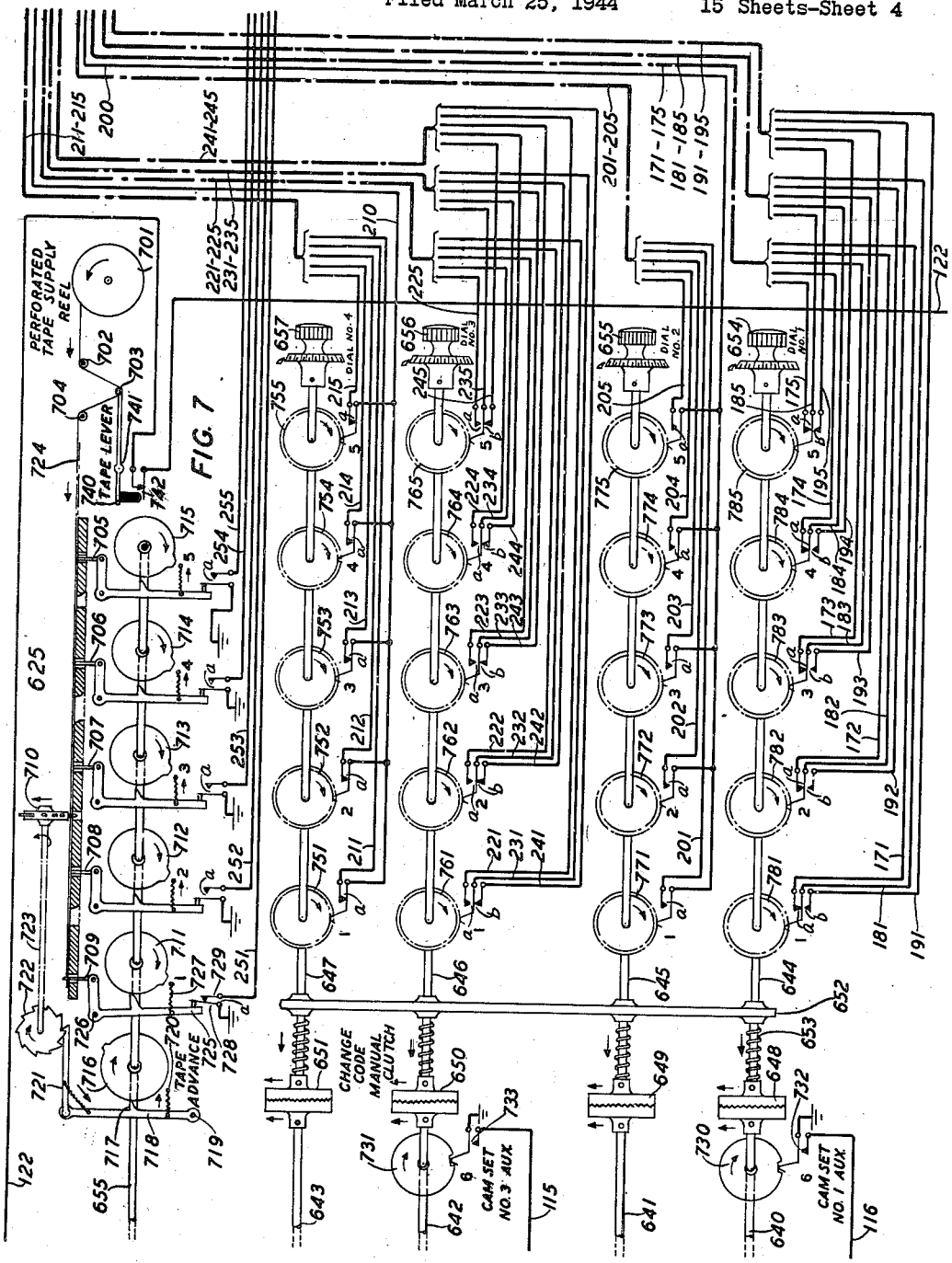

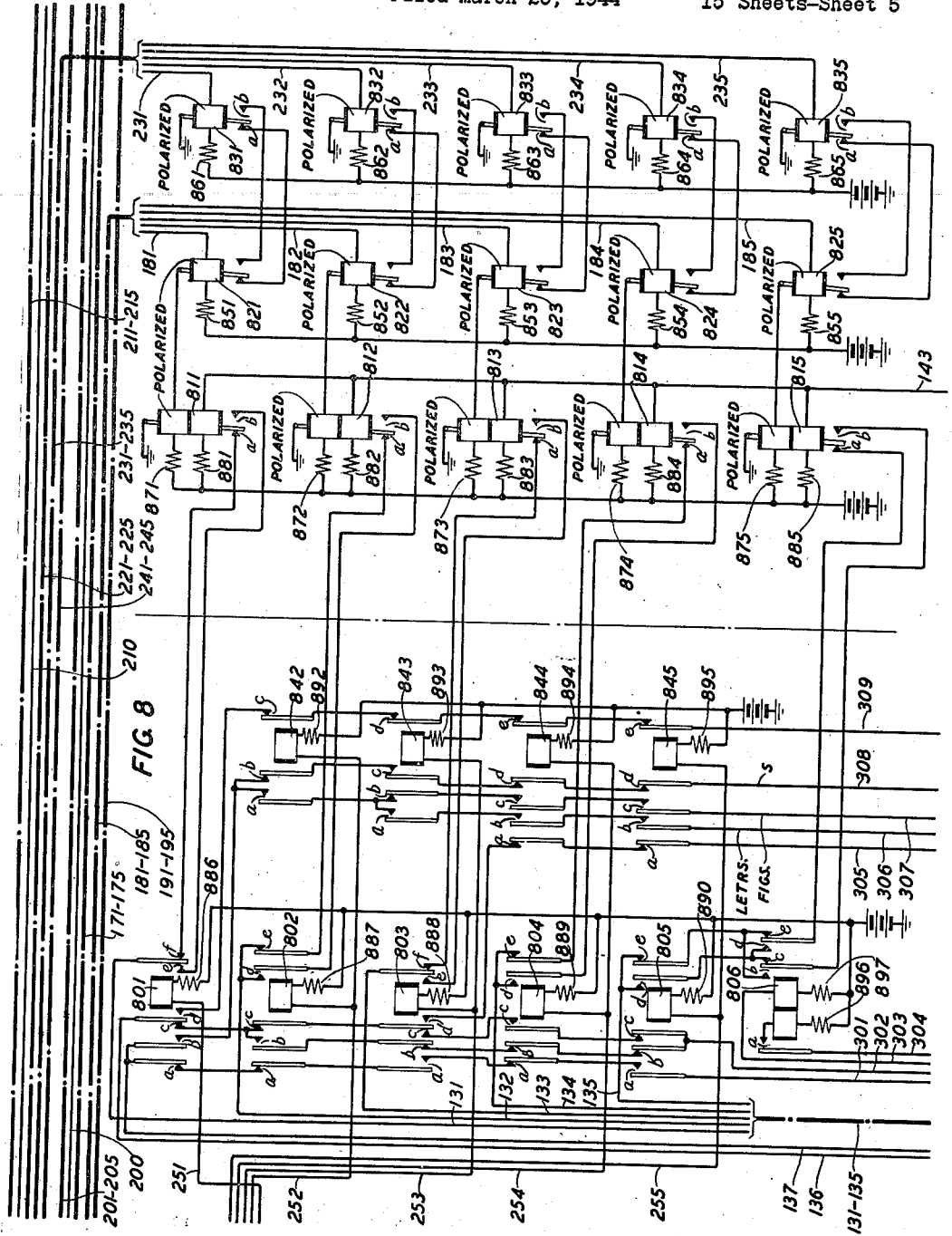

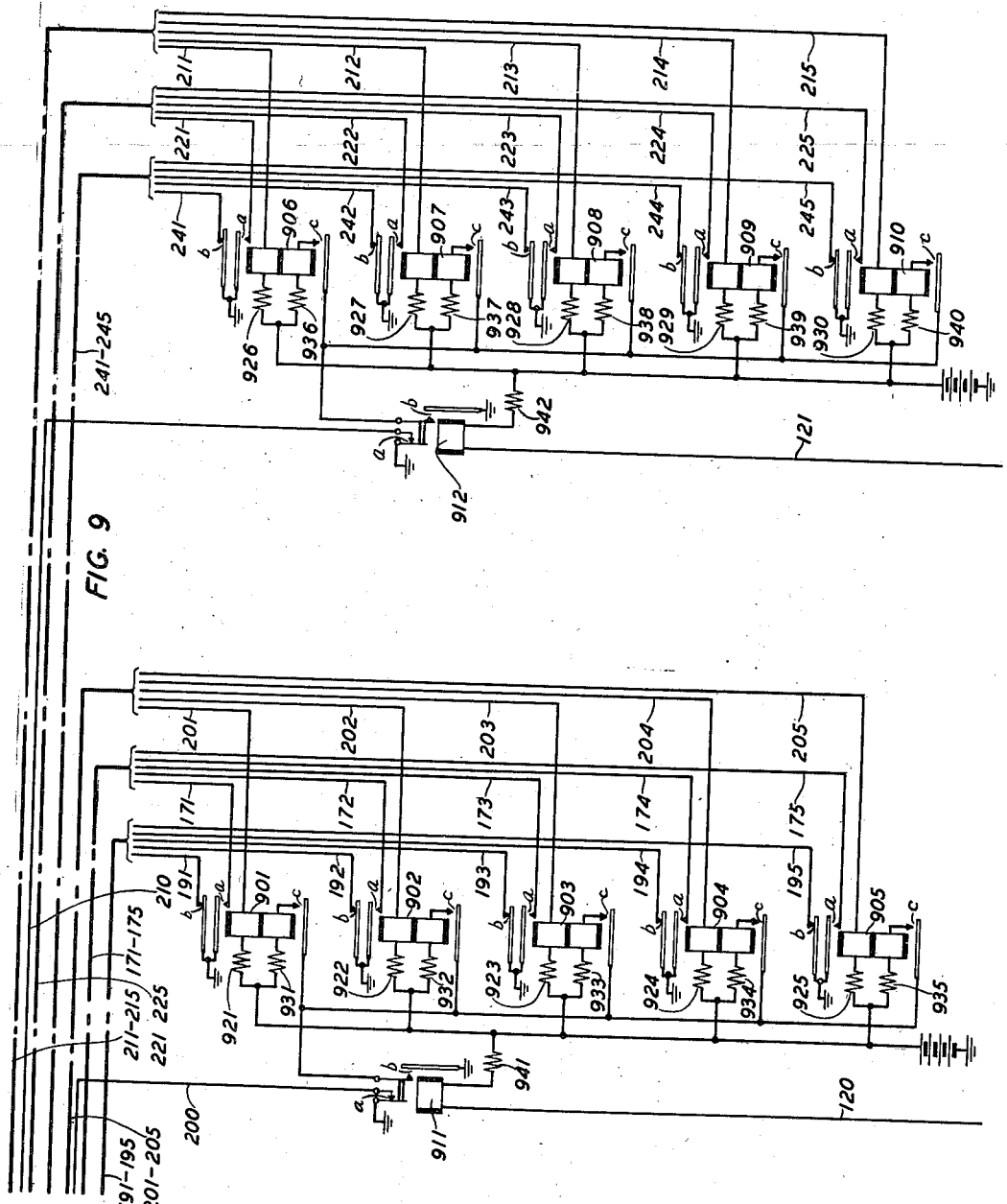

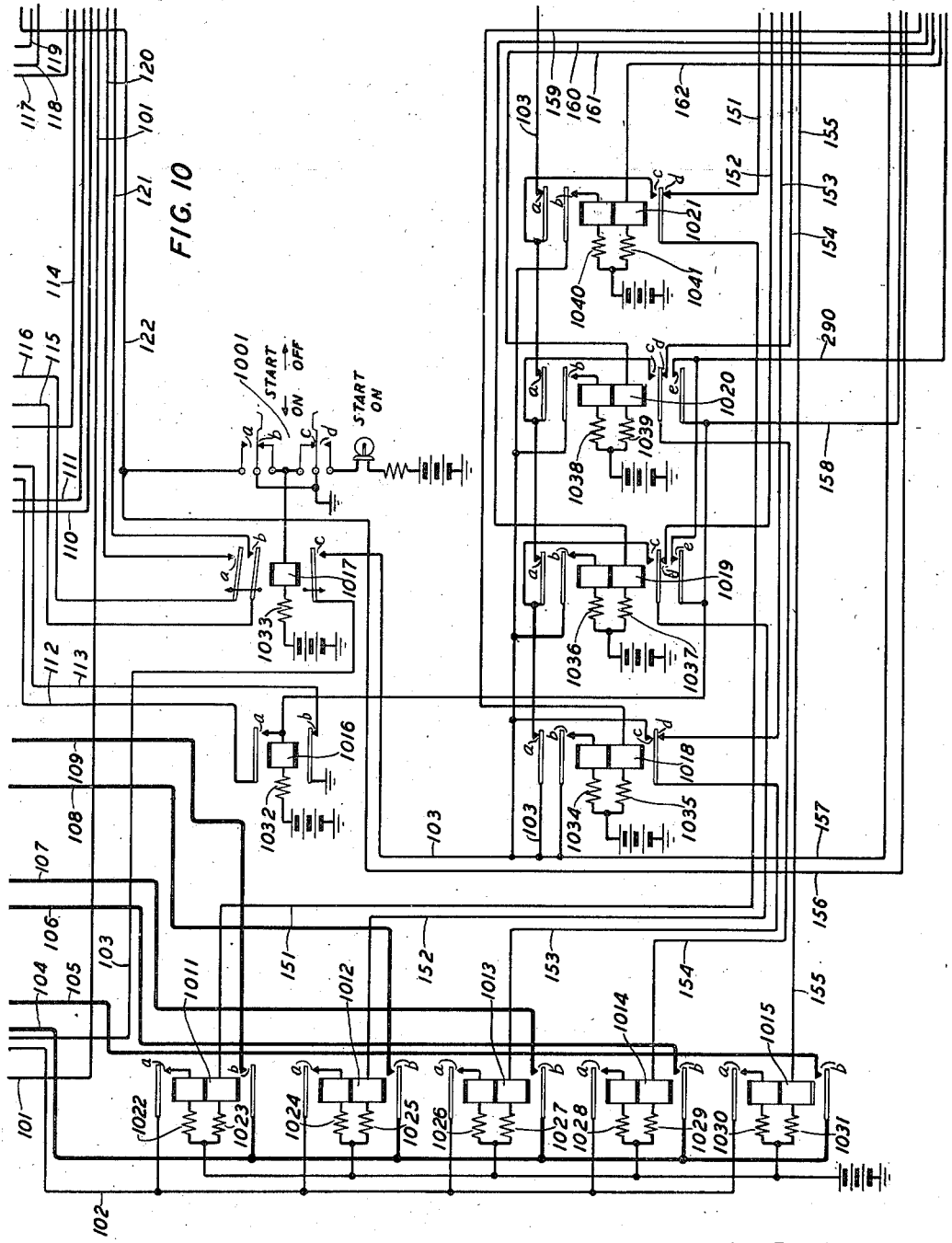

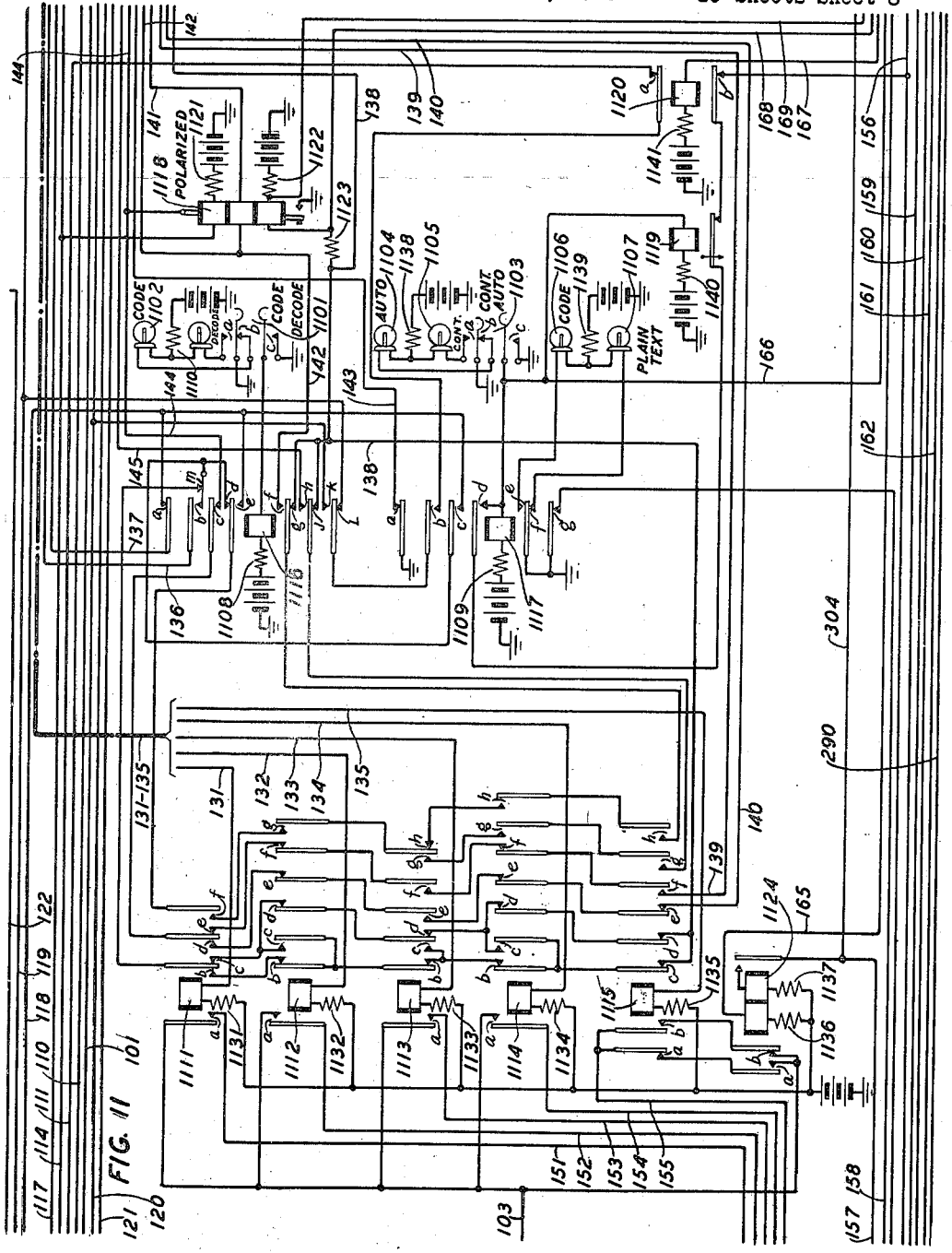

Aug. 20, 1946.  G. A. LOCKE  2,406,023
TELETYPEWRITER SIGNAL ENCIPHERING SYSTEM
Filed March 25, 1944   15 Sheets-Sheet 9
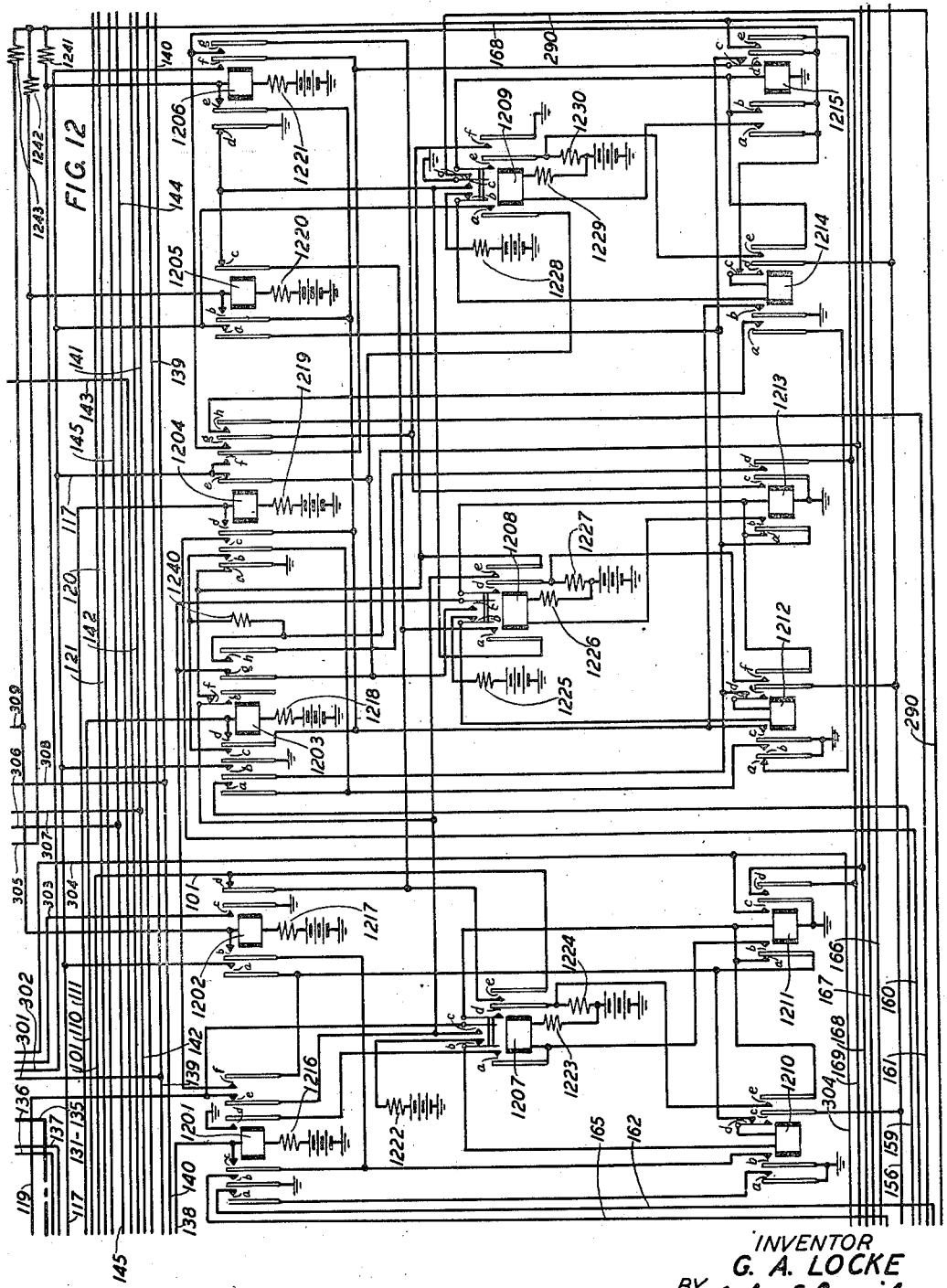
INVENTOR
G. A. LOCKE
BY John E. Cassidy
ATTORNEY

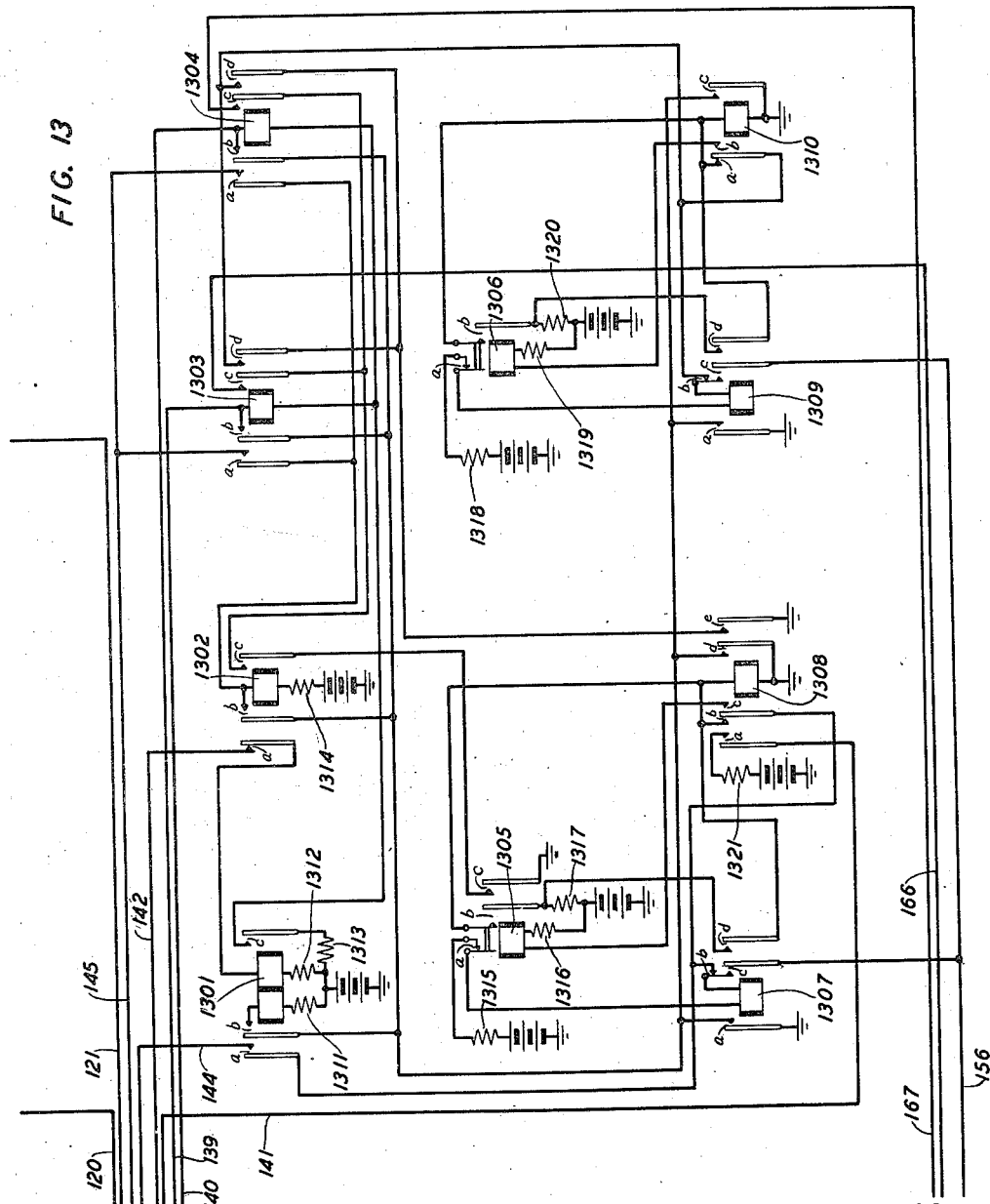

Aug. 20, 1946.  G. A. LOCKE  2,406,023
TELETYPEWRITER SIGNAL ENCIPHERING SYSTEM
Filed March 25, 1944  15 Sheets-Sheet 11
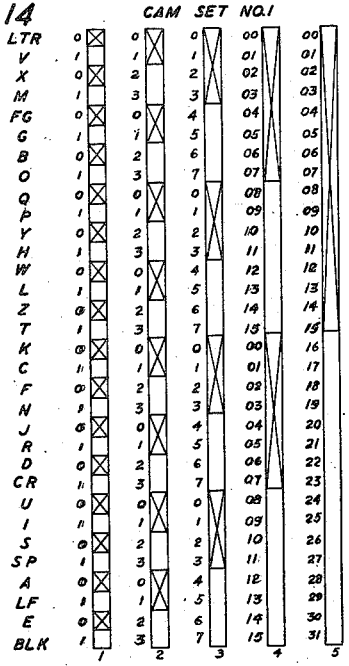
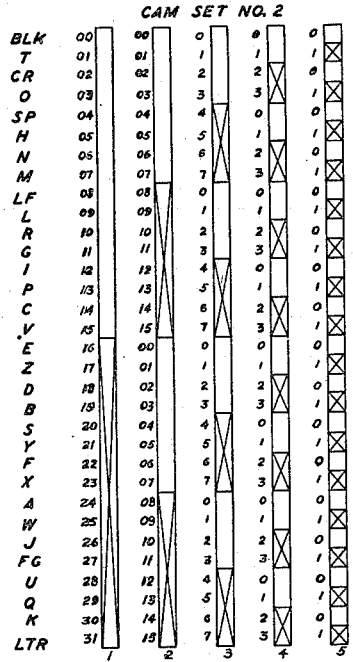
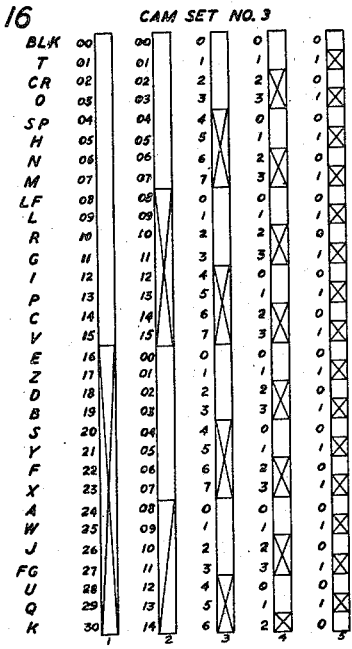
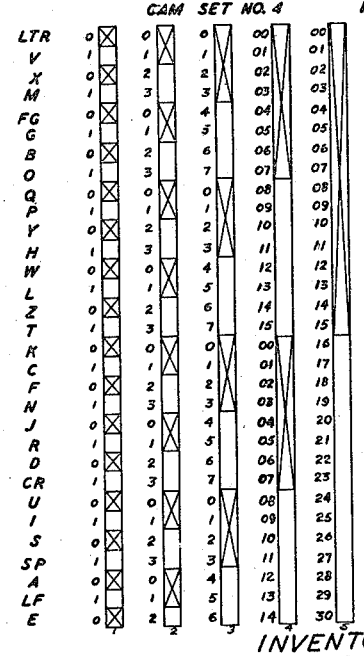
INVENTOR
G. A. LOCKE
BY John E. Cassidy
ATTORNEY Aug. 20, 1946.    G. A. LOCKE    2,406,023
TELETYPEWRITER SIGNAL ENCIPHERING SYSTEM
Filed March 25, 1944    15 Sheets-Sheet 12

PROFILE OF ENCIPHERING CAM SHOWING DATA FOR ONE TYPICAL RISER AND DEPRESSED SURFACE

PROFILE OF ENCIPHERING AUXILIARY CAM

INVENTOR
G. A. LOCKE
BY John E. Cassidy
ATTORNEY

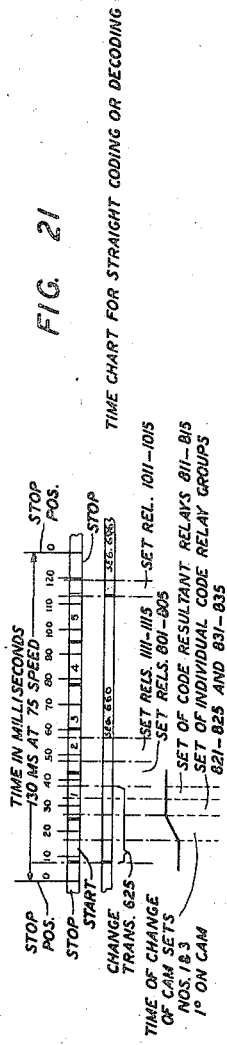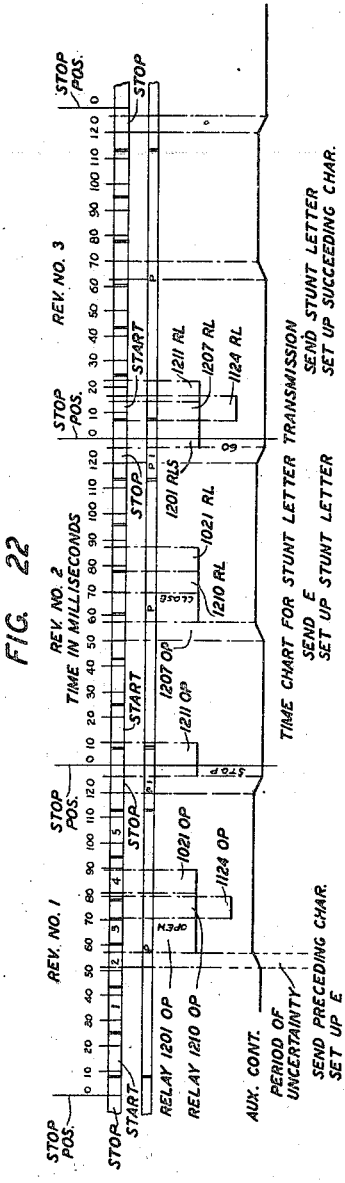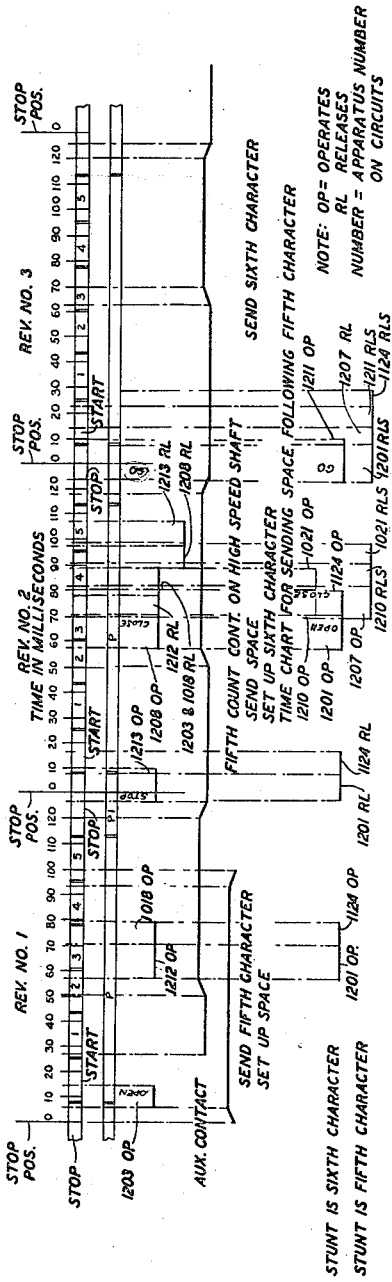

Aug. 20, 1946.   G. A. LOCKE   2,406,023
TELETYPEWRITER SIGNAL ENCIPHERING SYSTEM
Filed March 25, 1944   15 Sheets-Sheet 14

NOTE: OP = OPERATES
RL = RELEASES
NUMBER = APPARATUS NUMBER ON CIRCUITS

INVENTOR
G. A. LOCKE
BY John E. Cassidy
ATTORNEY

Aug. 20, 1946.　　　　G. A. LOCKE　　　　2,406,023
TELETYPEWRITER SIGNAL ENCIPHERING SYSTEM
Filed March 25, 1944　　15 Sheets-Sheet 15
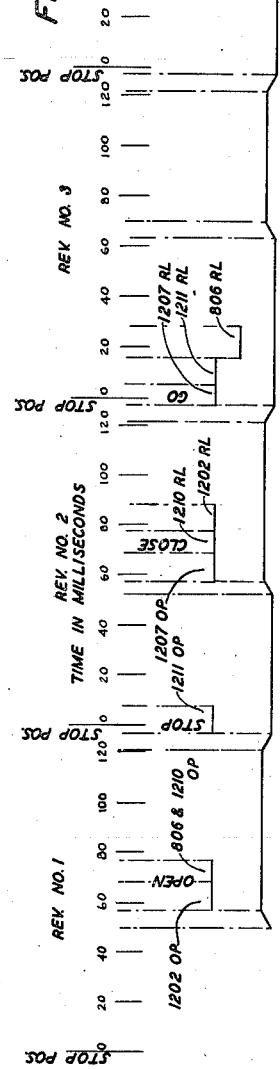
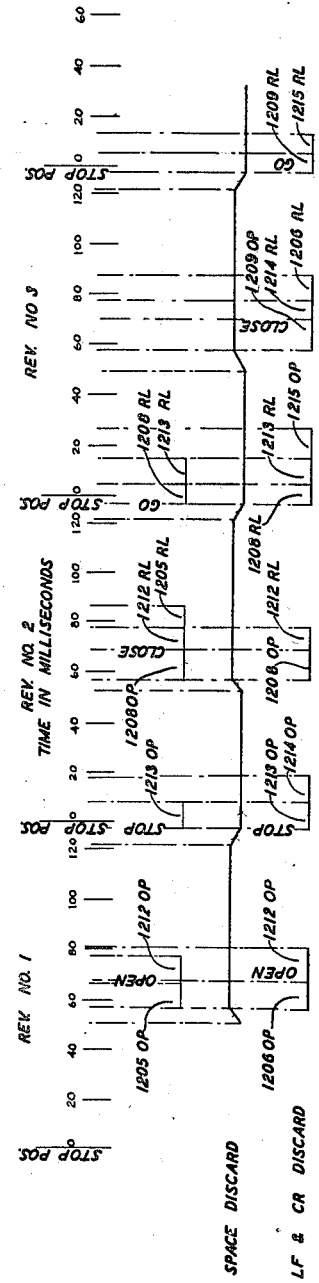
INVENTOR
G. A. LOCKE
BY John E. Cassidy
ATTORNEY Patented Aug. 20, 1946

2,406,023

UNITED STATES PATENT OFFICE 2,406,023

TELETYPEWRITER SIGNAL ENCIPHERING SYSTEM

George A. Locke, Glenwood Landing, N. Y., assignor to Bell Telephone Laboratories, Incorporated, New York, N. Y., a corporation of New York Application March 25, 1944, Serial No. 528,024

23 Claims. (Cl. 178—22)

This invention relates to the enciphering of telegraph signals and particularly to the enciphering of teletypewriter signals.

More particularly this invention is an improved enciphering system for enciphering signals transmitted by a modern teletypewriter in a manner to provide a neat printed record of an enciphered message by a mechanism which dispenses with the well-known key tape.

An object of this invention is the improvement of enciphering systems for telegraph signaling.

A more particular object of this invention is the improvement of systems for enciphering permutation code teletypewriter signals.

Another object of this invention is the provision of an improved system for the modification of permutation code combinations resulting from the random enciphering of permutation code combinations for teletypewriter signaling which latter combinations include functional code combinations such as line feed, carriage return, figures, etc., so that such functional code combinations do not appear in their regular form at random in the enciphered message.

Another object of this invention is to devise an improved system to produce a neat, compact typed record of randomly enciphered teletypewriter permutation code combinations which include functional code combinations.

Another object of this invention is the enciphering of permutation code telegraph signals by means of a system of cams which produce the enciphering permutation code combinations.

A method of enciphering teletypewriter signals which is well known in the art is the key tape method. In this method permutation code combinations such as Baudot code combinations are punched in a tape in random sequence. Each of the permutation code combinations, representing for instance a letter in a word in a message which is to be enciphered, is modified by one of the code combinations in the key tape. For instance, if the first of the five code elements corresponding to the letter is a marking element and the first of the five code elements of the enciphering symbol in the key tape is also a marking element, the enciphering mechanism may be arranged so that a marking element will be produced as the corresponding first element in the resultant enciphered symbol. If the second of the five code elements corresponding to the letter is a spacing element and the second of the five code elements of the enciphering symbol is a marking element a spacing element will be produced in the enciphered symbol. And, in general, where corresponding elements in the permutation code combination for the text letter and in the permutation code combination for the enciphering symbol are alike, marking elements will be produced and where they are unlike spacing elements will be produced in the enciphered symbol.

In order to decipher the resultant code combinations transmitted to the distant receiver, it is necessary to have a key tape at the receiving station which is identical with that used in enciphering the symbols at the transmitter. The received permutation code combination for a particular enciphered character is matched with the same code combination in the key tape and the original permutation code combination corresponding to the letter in the text is thereby produced. This will become more apparent from the following.

Let it be assumed that the Baudot permutation code combination for a particular letter in a word in a text to be enciphered is represented by $+ - + - -$ where $+$ represents a current or marking signal element and $-$ represents a no current or spacing signal element. Let it be assumed that the permutation code combination with which it is combined in the key tape to form an enciphered permutation code combination is $+ - - - +$. In the enciphering mechanism is arranged so that corresponding like signal elements in the two combinations produce a $+$ or marking signal element and unlike elements produce $-$ or spacing signal element the result and enciphered symbol will be:

$+ - + - -$ Text
$+ - - - +$ Key tape
---
$+ + - + -$ Enciphered

If now the enciphered permutation code combination is transmitted to a distant station and matched against the identical code combination in a key tape with which it has been enciphered in a mechanism which is also arranged to produce a marking signal element when corresponding signal elements in the received enciphered code combination and in the key tape are alike and a spacing signal element when they are unlike, the permutation code combination of the letter of the original text reappears:

$+ + - + -$ Enciphered
$+ - - - +$ Key tape
---
$+ - + - -$ Text

In order to minimize the possibility of the deciphering of an enciphered massage by unauthorized persons, it has been determined that a key tape having about one million randomly occurring permutation code combinations is required. If one million code combinations were punched in a single key tape the tape would be excessively long. The practical equivalent is produced by the use of two key tapes at each station instead of one. Each of the tapes has slightly less than one thousand code combinations. The tapes have slightly different numbers of code combinations. Each of the combinations in the first key tape at a particular station is combined with a particular code combination in the second key tape, say the first code combination therein, to produce an enciphering code combination which is then combined with the code combination of the text to produce an enciphered symbol. Then the second key tape is stepped to the next combination. Each of the code combinations in the first key tape is then combined with the second code combination in the second key tape and so on. The number of enciphering code combinations which can thus be produced is equal to the product of the number of code combinations in each tape. The combined lengths and the time and effort of producing the two key tapes is thus very considerably reduced as compared with the length of and the time and effort of producing a single key tape providing a corresponding number of enciphering code combinations. However, the two key tape arrangement in this respect still leaves much to be desired as the tapes tear easily and become multilated and worn if used for any considerable length of time.

The invention herein corrects this condition by an arrangement wherein a system of cams is used for enciphering instead of paper tapes. This is achieved in part by using four sets of five enciphering cams each at each station. The starting positions of each of the cams is adjustable with respect to the starting position of each of the others. This greatly increases the number of different enciphering sequences obtainable before repetition is necessary.

As is well understood in the art, in modern teletypewriter tranmission systems, in addition to transmitting permutation code combinations representing letters and numbers it is also necessary to transmit other combinations to perform certain functions. For instance it is necessary to transmit a particular code combination to insert a space between words. It is necessary to transmit another particular code combination to adjust the receiving teletypewriter so that characters are typed on the succeeding line. Another particular code combination is required to return the carriage of the receiving teletypewriter to the normal starting position. In addition, a particular code combination is required to shift the receiving mechanism so that it prints figures instead of letters and yet another to readjust the receiving teletypewriter to again print letters.

When the code combinations for the text of a message are combined with the random enciphering code combinations, any one of the code combinations which performs the functions enumerated above may be produced in random fashion.

Reference is made to Patent 1,416,765, G. S. Vernam, May 23, 1922 which discloses an arrangement wherein randomly enciphered teletypewriter code combinations corresponding to teletypewriter receiver stunt combinations are each translated into two-letter combinations. Further in the arrangement per Patent 1,416,765 the enciphered combinations are arranged in groups of five separated by a space, ten groups to the line. In the arrangement per Patent 1,416,765, however, it is necessary to type the enciphered message on a teletypewriter receiver before it can be transmitted. In producing the enciphered message a teletypewriter receiving instrument is actually part of the enciphering mechanism. As stunt combinations appear and are recognized by the sensing circuits in the enciphering circuits, conditions are imposed on various complementary control conductors which extend into a teletypewriter receiving printer which forms part of the enciphering mechanism, per se. From eight to thirteen conductors are employed in the various embodiments interconnecting the teletypewriter receiver and the other parts of the enciphering circuit per Patent 1,416,765. In such an arrangement, obviously the teletypewriter receiver forms part of the enciphering mechanism per se. It is controlled over the local conductors and adjusted as necessary in response to the adjacent controls to print neat copy. If the teletypewriter enciphering mechanism other than the teletypewriter receiver in Patent 1,416,765 were in one city and the receiver were in a distant city, it would be necessary to interconnect the separated components of the apparatus in Patent 1,416,765 by from eight to thirteen conductors or their equivalent. The arrangement in Patent 1,416,765 is not intended to be and is not operated in such manner, but attention is called to this aspect of the operation of the apparatus of Patent 1,416,765 in order to point out one of the important aspects of applicant's invention.

In applicant's arrangement it is not necessary to type the enciphered message or to punch it in a tape before it is transmitted. The enciphered combinations are transmitted directly as they are produced. The randomly appearing stunt combinations are modified as they appear and are transmitted directly from the enciphering mechanism to the distant city without the intermediary of a teletypewriter receiver. Spaces are introduced between groups of five combination and line feed and carriage return combinations are introduced after each ten groups of five combinations each without employing a teletypewriter receiver in the enciphering mechanism per se.

At the distant station the enciphered message, in accordance with this invention may be received directly in enciphered form on a teletypewriter receiver which will print ten groups of five enciphered letters each to a line. If it is desired the message may be simultaneously punched in a tape which is then used to control the deciphering mechanism which is part of this invention.

If it is preferred the enciphered message may be typed in enciphered form, ten words of five letters each to a line at the transmitting end. When in this form, the enciphered message may be delivered to commercial companies for transmission over commercial lines. As an aid in such operation, the apparatus of the invention herein is arranged so that part of the message, such as the address and signature may be in plain text and part may be enciphered. In response to the appearance of particular sequences of three code combinations, either in the tape bearing the plain text or in the tape bearing the enciphered message the enciphering and deciphering mechanisms of the invention herein will be controlled to shift from plain text to enciphered combinations and vice versa.

A feature of this invention is an arrangement in which four sets of cams cooperate in pairs of sets to establish a resultant enciphering permutation code combination.

Another feature of this invention is an arrangement by means of which the starting position of each of the cams of each set is individually adjustable with respect to the starting position of each other cam in the group and the starting position of the cam group is adjustable with respect to the starting position of other cam groups.

Another feature of the invention is a system of clutches which clutches are controlled in different manners in response to the random appearance of functional code combinations in the enciphered text at different times to permit the transmission of other non-functional code combinations in their stead as well as the introduction of certain functional code combinations when required.

Another feature of the invention is an arrangement in which randomly enciphered permutation code signal combinations including stunt combinations translated into non-stunt combinations are produced and transmitted from one station to a distant station without the intermediary of a teletypewriter receiver at the transmitting station.

These and other features will become apparent from the following description when read with reference to the associated drawings exemplifying one embodiment of the invention, in which:

Fig. 1 is an introductory sketch explaining operations underlying the invention;

Fig. 2 is a diagram used in explaining the relationship of the major apparatus units involved in teletyping a message, enciphering the message, transmitting the enciphered message and receiving an enciphered message in enciphered form on a receiving page teletypewriter;

Fig. 3 is a diagram used in explaining the relationship of the major apparatus units involved in teletyping a message, enciphering the message, transmitting the enciphered message, receiving the enciphered message on a typing reperforator, deciphering the message and receiving the deciphered message on a receiving page teletypewriter;

Fig. 4 is a diagram showing the manner in which the drawings per Figs. 5 to 13 should be arranged, each in relation to the other, to form an operative system;

Figs. 5 to 13 show the apparatus and circuits of the enciphering and deciphering system of this invention;

Figs. 14 to 17 are development diagrams used in explaining the arrangement of the four sets of enciphering cams;

Figs. 21 to 27 are time charts used in explaining the relative times of occurrence of various operations.

*General description of operation*

Figure 18:
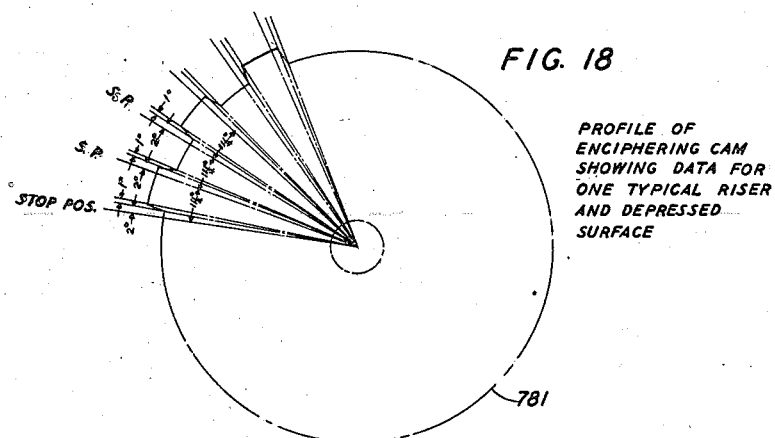
Figs. 18 and 19 show details of the enciphering cams and enciphering auxiliary cams respectively.

Refer now to Fig. 1 which is an introductory sketch for use in explaining the basic operations underlying the invention.

In Fig. 1 four sets of enciphering cam-operated contacts are shown, cam set contacts 1, 2, 3 and 4. The cams will be described more fully below.

There are five rotatable cams in each set. Each cam, not shown in Fig. 1 controls an individually adjustable element or armature such as armatures 6 to 10 controlled by cam set 1. Each armature is operated to engage one or the other of its two contacts such as 11 or 12, depending upon the cutting of its respective cam. Successive permutation code combinations of the contacts associated with each cam set are established in response to the rotation of the cams.

The contacts associated with cam sets 1 and 2 cooperate as a group to control the operation of relays 15 to 19. Similarly, the contacts associated with cam sets 3 and 4 cooperate as a group to control the operation of relays 30 to 34. If a particular cam in cam set No. 2 presents a raised surface in a particular position on its periphery to armature 21, the armature will be operated so as to engage its contact 22. If simultaneously a raised surface on the periphery of the corresponding cam in cam set No. 1 is presented to armature 6, armature 6 will engage contact 12. Under these circumstances a circuit may be traced from ground through contacts 22 and 12 in series and through the winding of relay 15 to battery, actuating the armature of relay 15 to engage its contact 23. If the periphery of the cam presented to armature 21 in cam set No. 2 is depressed, the armature will engage contact 24. If the periphery of the cam presented simultaneously to armature 6 in cam set No. 6 is depressed, armature 6 will engage contact 11. Under these circumstances a circuit may be traced from ground through contacts 24 and 11 in series and the winding of relay 15 to battery, operating the armature of relay 15 to engage contact 23 as heretofore. If either one of armatures 21 and 6 is actuated to the left and simultaneously the other of these two armatures is actuated to the right there will be no path available to energize relay 15. Under these circumstances the armature of relay 15 will engage contact 25. In order to energize a relay such as 15 therefore it is obvious that each of the armatures such as 21 and 6 must be in corresponding positions. The armatures of relays 15 to 19 will be operated in conformity with the resultant of the permutation codes established by the cams of cam sets No. 1 and No. 2. Similarly, the armatures of relays 30 to 34 will be controlled by cam sets 3 and 4.

The code resultant relays 35 to 39 are controlled through the cooperation of relays 15 to 19 and 30 to 34. If the armature of a relay such as 15 in one group is actuated to a particular position and the armature of a corresponding relay such as 30 in another group is actuated to a corresponding position the circuit extending from ground such as 41 will be closed through the contacts in series and the winding of relay 35 to battery. If the armature of a relay such as 15 in one group is actuated to a particular position and the armature of a relay such as 30 in the other group is actuated to a non-corresponding position the path through the relay contacts will be open and the winding of the corresponding code resultant relay will be deenergized.

As a result of the above-described operations the resultant of the permutation codes established by cam sets 1, 2, 3 and 4 will be set up by relays 35 to 39. Transmitting contacts 80 to 84 will be set permutatively in conformity with the permutation code combinations of the message text. The armatures of relays 45 to 49 will be controlled by the settings of contacts 80 to 84. If a contact such as 80 is closed, a circuit will be established from ground through contact 80 and the winding of relay 45 to battery, operating the armature of relay 45 to engage contact 50. If a contact such as 80 is open the armature of a relay such as 45 will be actuated to engage a contact such as 51. The code combinations established on the armatures of relays 45 to 49 will be combined with the enciphering resultant code combinations established by relays 35 to 39. If the armatures of relays in corresponding positions on the message text relays 45 to 49 and on the enciphering code resultant relays 35 to 39 are both in corresponding positions, circuits will be established from ground through contacts such as 85 and 50 in series and the winding of a relay such as relay 55, closing contact 60. If the armatures of relays such as 35 and 51 are not actuated to corresponding positions, there will be no closed path available for operating a corresponding relay such as relay 55. The permutation code combinations established by combining the permutation code combination of the message text with the permutation code combination resulting from the operation of cam sets 1 to 4 will be established on the armatures of relays 55 to 59.

If all that were required were the transmission of enciphered permutation code combinations resulting from the modification of the message text code combinations by the resultant enciphering code combinations, the code combinations appearing on the code resultant relays 35 to 39 could be combined directly with the code combinations appearing on the message text transmitting contacts 80 to 84. The three groups of relays, namely, the ciphered text transmitting relays 45 to 49, the storing relays 55 to 59 and the distributor relays 65 to 69 are introduced to permit the sensing of the enciphered text code combination to detect, among the random code combinations appearing, the code combinations which would if transmitted cause a receiving teletypewriter to respond by returning its carriage to the starting position, operating the line feed mechanism operating the spacing mechanism, shifting to the upper or lower case or introducing a space at undesired times. In short, these relays prevent the random transmission of functional or stunt combinations as they are known in the art and introduce functional combinations at proper times to print the enciphered text in a neat pattern, namely, in five-character groups, ten groups to a line.

In order to perform these functions considerable apparatus in addition to that disclosed in Fig. 1 and shown on the detailed circuit and apparatus drawings herein is required. For instance, in order to determine if a stunt code combination has been established at random on relays 55 to 59, circuits are established in series through contacts, which are shown only in the more detailed drawings, when the stunt code combination appears. Under such circumstances the stunt code combination is not transmitted. The single stunt combination is replaced by a two-letter combination. The first letter of the two-letter combination is always an E. The second letter may be any one of five letters depending upon the particular function. The combination corresponding to the function is changed by modifying the fifth element of the combination.

In order to do this, that is, permit the translation of a random stunt code combination into two code combinations, the invention herein is arranged so that each of the randomly enciphered code combinations appearing on relays 55 to 59 is sensed to detect a stunt combination while the preceding code combination is being transmitted.

The transfer of the code combinations appearing on relays 55 to 59 to the distributor relays 65 to 69 in proper order and the transmission of the code combinations are under control of distributor 70. This distributor has two pairs of rings. These rings are indicated in the developed condition. One pair of rings, solid ring 71 and segmented ring 72, which are connected to the single transmission channel formed by the two line conductors, controls the transmission of the enciphered code combinations. The second pair of rings, grounded solid ring 73 and segmented ring 74, controls the times of transfer of the enciphered code combinations from the group of relays comprising relays 55 to 59 to the group of relays comprising relays 65 to 69. Rings 71 and 72 are interconnected by one pair of brushes 76 and 77 and rings 73 and 74 are interconnected by a second pair of brushes 78 and 79. Both pairs of brushes are carried by one rotatable arm, not shown in introductory Fig. 1 but indicated as arm 101 in Fig. 6.

If a code combination appearing on the contacts of relays 55 to 59, when sensed by the series circuit through auxiliary contacts on these relays shown in the more detailed drawings, is not a stunt combination appearing at random, after the preceding code combination has been transmitted by means of relays 65 to 69 and distributor rings 72 and 71, the code combination will be transferred at the proper time under control of rings 73 and 74 to the transmitting mechanism. It will then be transmitted. If, however, it is a random stunt combination, the combination corresponding to the letter E will be established on relays 65 to 69 as soon as the preceding character has been transmitted. During this interval the code combination corresponding to the random stunt will be modified by changing the fifth element only. The changing of the fifth element of any of the five stunt combinations results in the formation of a code combination corresponding to a particular one of five-letter combinations. Then the resulting letter combination will be transferred to the transmitting apparatus for transmission as the second letter of the two-letter combination substituted for the random stunt combination.

The above will serve as an introduction to the detailed description to follow.

It is pointed out that in order to perform other functions such as to introduce a combination for a space at the proper interval, to separate the code combinations into groups of five symbols (or code words as they will be called herein) and in order to introduce proper code combinations at the end of a line, etc., a counting mechanism, a system of clutches and controls therefor are included in the detailed drawings. Further, the substitution of two combinations for one introduces complications. For instance, a complication arises when a random stunt combination occurs in position to be transmitted as the fifth element of a code word and the letter E and the second letter of the two-letter combination must be separated by a space. Another occurs when a random stunt combination appears in position for transmission as the last combination in the last code word of a line. Caring for these and other conditions requires that the system of Fig. 1 be elaborated into the detailed system of the invention shown on the other drawings herein which will now be described.

Refer now to Fig. 4. Fig. 4 shows the manner in which Figs. 5 to 13, inclusive, should be arranged each in relation to the other to form an operative system.

The keys in Fig. 5 may be operated in different manners to obtain different operating arrangements as shown in Figs. 2 and 3.

In the arrangement shown in Fig. 2 a sending and receiving page teletypewriter equipped with a perforator is indicated by the left-hand rectangle. It is connected to a cipher unit which enciphers and transmits the message. The cipher unit is indicated by the middle rectangle. The cipher unit transmits the message to a receiving-only page teletypewriter which prints the enciphered message in five-letter code words, ten words to a line. The receiving-only page teletypewriter is represented by the right-hand rectangle. It may be located at the same station as the enciphering apparatus shown in the two left-hand rectangles, or if desired, it may be located at the office of the local commercial telegraph company or at an office in a distant city. The enciphered message in this form may, if desired, be transmitted over the facilities of a commercial telegraph company. Thereafter, the received message may be deciphered and printed as it appeared in the original text by running the message through the ciphering unit and modifying it by means of the code combinations resulting from cam settings corresponding to those used in originally enciphering the text.

Fig. 3 shows an arrangement wherein, as represented by the successive rectangles from left to right, a sending and receiving page teletypewriter with perforator, perforates and records a plain text message. The plain text message is impressed on the cipher unit which enciphers and transmits the message directly to a distant station. The enciphered message is received in the distant station by a typing reperforator which reperforates and prints the ciphered message. The ciphered message is impressed on the cipher unit which deciphers the message. Then the deciphered message is received on a receiving-only page teletypewriter which prints the deciphered message.

The reference numeral 527 in Fig. 5 represents a teletypewriter set which comprises a receiving printer, a keyboard operated type perforator and a keyboard operated transmitter. A set which combines these units is disclosed in Patent 1,965,572 granted July 10, 1934, to C. W. Burcky et al. The receiving printer unit which is contemplated in the Burcky et al. patent is disclosed in full detail in Patent 1,904,164, granted April 18, 1933, to S. Morton et al.

The reference numeral 525 in Fig. 5 represents a receiving-only teletypewriter. Such a receiving teletypewriter is disclosed also in the above-mentioned Patent 1,965,572.

The reference numeral 526 in Fig. 5 represents a typing reperforator. Such a mechanism is disclosed in Patent 2,273,909, granted February 24, 1942, to C. W. Swan.

The reference numeral 625 in Fig. 7 represents a tape transmitter. Such a transmitter is disclosed in Patent 2,055,567 granted September 29, 1936 to E. F. Watson.

The disclosures of the aforementioned patents are incorporated herein by reference as part of the present specification.

With the keys in Fig. 5 in the positions shown, a circuit may be traced from battery 501 through the receiving selector magnet 502, contact 503 of key 504, teletypewriter transmitting contacts 505 and contact 506 of key 504 to ground 507, energizing the sending and receiving teletypewriter. The sending and receiving teletypewriter is equipped with a well-known perforator which perforates the code combinations of the characters and stunt functions of the message typed on the teletypewriter in a well-known manner. The perforated tape is stored on a storage reel 598. The perforated tape containing the message to be enciphered is then transferred to a perforated tape supply reel 701 in Fig. 7 and is run over roller 702 through tape lever roller 703 and roller 704 over the sensing pins 705 to 709 under the influence of the tape feed mechanism 710 in a manner to be described more in detail hereinunder. The code combinations appearing in the tape are modified by the mechanism of the ciphering unit in a manner to be described and are impressed on the transmitting distributor 601. The enciphered signals are impressed on a circuit which may be traced from ring 602 of the distributor through conductor 603 into Fig. 5 where the circuit extends through contacts 509 and 510 of key 504, contact 511 of key 512 through selecting magnet 513 of the receiving-only teletypewriter 525, through contact 514 of key 512, contact 515 of key 516 through the selecting magnet 517 of the typing reperforator 526, contact 518 of key 516, contact 519 of key 520 and resistance 521 to battery 522. The opposite side of the transmitting circuit extends through brushes 604 and 605 in series through the outer ring of distributor 601, conductor 606 which extends into Fig. 5 and through contact 523 of key 520 to ground 524. Under these circumstances, the enciphered message will be printed by the receiving-only teletypewriter 525 and will be reperforated by the typing reperforator 526. This set-up corresponds generally to the arrangement shown in Fig. 2 except that a typing reperforator is connected into the system also so that the enciphered message will be both printed on the receiving-only teletypewriter and reperforated by the typing reperforator.

While the system is thus arranged, a distant teletypewriter switching system indicated by rectangle 528 is connected by means of conductors 529 and 530 through loading 531 in such manner that a calling signal 532 may be operated to signal an incoming message. Conductor 529 is extended through resistance 533 and contact 534 of key 520 through calling signal 532 to ground. Conductor 530 is connected through contact 535 of key 520 to ground.

The keys may be operated in a manner to provide the arrangement indicated in Fig. 3. For this condition, as indicated in Fig. 3 after the message has been typed and reperforated and thereafter enciphered, it is transmitted to a distant station. In order to transmit from the ciphering unit to a distant station, keys 512, 516 and 520 in Fig. 5 are actuated. The transmitting distributor is then connected through conductor 603, contacts 509 and 510 of key 504, contacts 536 and 537 of key 512, contacts 538 and 539 of key 516, contact 540 of key 520 and resistance 533 to conductor 529 which extends to the distant station. Conductor 606 is extended through contact 541 to conductor 530 which extends also to the distant station. In response to the ringing of a bell such as 532 at the distant station, keys corresponding to keys 520 and 512 will be operated at the distant station. This closes a circuit which corresponds to the circuit which extends through contact 519 of key 520, contact 518 of key 516, selector magnet 517 of the typing reperforator 526, contact 515 of key 516, contacts 537 and 536 of key 512, contacts 510 and 509 of key 504, conductor 603, inner solid conducting ring 602 of transmitting distributor 601, brushes 604 and 605 in series through stop segment 607 of distributor 601, conductor 606 and contact 541 of key 520 to conductor 530. Battery will be supplied from the distant station. The winding of the selector magnet corresponding to selector magnet 517 in the typing reperforator at the distant station will be connected in series with transmitting distributor 601. The enciphering cams at the distant station will be set to start in the same positions as used in enciphering the code. The enciphered message received by typing reperforator 517 at the distant station will be placed on the tape supply reel corresponding to reel 701 at the distant station. As a result of modifying the resulting enciphered message with the same cam combinations as were used in enciphering the original text, the original text will be produced on the distributor corresponding to distributor 601 at the distant station and can, by the operation of the keys at the distant station, be impressed on the selector magnet corresponding to magnet 513 of the receiving-only teletypewriter 525 at the distant station.

*General description of relationship of major components*

At this point a general description of the relationship of the major components of the ciphering mechanism per se will be given.

In the upper left-hand corner is shown a motor 608 (Fig. 6). In one embodiment this motor will be driven at a speed of 1800 revolutions per minute. The motor is connected through a spur gear 609 and a cooperating spur gear 610 through main clutch 611 to main shaft 612. When the mechanism of the invention is to be operated so as to encipher 75 words per minute, the ratio of gear 610 to gear 609 will be 47 to 12. Shaft 612 will, therefore, rotate at approximately 459.5 revolutions per minute. Securely fastened to shaft 612 are a pair of cooperating beveled gears 613 and 614. The ratio of the beveled gears is 1 to 1. Gear 614 is connected to shaft 616 through brush clutch 615. Distributor arm 101 is rigidly secured to shaft 616 so that distributor arm 101 rotates at the same rate as shaft 612 when the driving and driven portions of brush clutch 615 are in engagement. The counting mechanism is driven through worm 617 which is rigidly secured to shaft 612 and with cooperating worm gear 618 through count wheel clutch 619. The ratio of the worm gear and the worm is such that the count wheel shaft 626 rotates once while main shaft 612 rotates 59 times. Beveled gear 627 which is rigidly secured to main shaft 612 and cooperating beveled gear 621 which drives the main cam shaft 623 for the enciphering cams have a ratio of 1 to 1. Beveled gear 621 drives the main enciphering shaft 623 through code clutch 622. Rigidly secured to shaft 623 are four sets of spur gears. Gear 630 is coupled to gear 631. Gear 631 in turn drives worm 638 and worm gear 639 which is rigidly secured to driving shaft 640 for the first set of 5 enciphering cams 781 to 785. The ratios of gears 630, 631, 638 and 639 are such that shaft 640 rotates once while shaft 623 rotates 32 times. Each of the other three sets of enciphering cams in coupler to shaft 623 in the same general manner as explained for the first set of enciphering cams. The ratios of the gears which interconnect the second set of enciphering cams 771 to 775 to shaft 623 are such that shaft 641 rotates once while shaft 623 rotates 1024 times. The ratios of the gears interconnecting shafts 623 and 642 are such that shaft 642 which drives the third set of enciphering cams 761 to 765 rotates once while shaft 623 rotates 31 times. The ratios of the gears interconnecting shaft 623 and shaft 643 which drives the fourth set of enciphering cams 751 to 755 are such that shaft 643 rotates once while shaft 623 rotates 961 times. Shaft 640 is coupled to shaft 644 through enciphering cam set clutch 648. Shaft 641 is coupled to shaft 645 through clutch 649. Shaft 642 is coupled to shaft 646 through clutch 650. Shaft 643 is coupled to shaft 647 through clutch 651. Bearing support 652 provides a fixed bearing for each of the enciphering cam shafts.

Each of the enciphering cam shafts, such as 644, is arranged so that it may be oriented with respect to its respective driving shaft, such as 640, by means of a clutch member such as 648. The right-hand end of spring 653 engages the left-hand side of the lower bearing in bearing support 652. The left-hand end of spring 653 engages the right-hand end of the driven member of clutch 648. Shaft 644 may be disengaged from its respective driving member 640 by drawing the shaft to the right by means of dial knob 654 which is rigidly secured to the right-hand end of shaft 644. Each of the other enciphering gear shafts is similarly arranged. This mechanism is used in setting up the enciphering code combination sequence or key as it is called. The setting of each enciphering cam set shaft is adjustable as a unit. The setting of each individual cam on the shaft is also adjustable. This mechanism will be explained in detail below.

Transmitter shaft 655 is coupled to main shaft 612 through clutch 624. Rigidly secured to the transmitter shaft 655 are the 5 transmitting cams 711 to 715 and the tape advance cam 716. The transmitter cams are driven at the same speed as that of main shaft 612. The transmitting mechanism per se is well known in the art and is shown in part diagrammatically. Each time shaft 655 rotates, tape advance cam 716 actuates its follower 717 on bar 718 moving the bar counter-clockwise about its fixed center 719 against the influence of spring 720. Bar 718 carries at its upper end pawl 721 which engages with ratchet 722 rotating shaft 723 which in turn rotates tape feed wheel 710. For each rotation of shaft 655 the tape 724 is advanced longitudinally one step so as to present a new code combination which is punched in the tape laterally, to the sensing pins 705 to 709. As will be explained below, the positions of the raised surfaces on the peripheries of the sensing pin cams 711 and 712 are in such relation to the position of the raised surface on the periphery of tape advance cam 716 that the tape 724 is advanced to the next succeeding position after pins 705 to 709 have been withdrawn. Transverse sections of tape 724 are punched or unpunched in 5 positions in a manner to correspond to the code combination for a particular character or stunt function. The 5 areas are presented to the 5 pins 705 to 709. Where an area is punched, the corresponding bell crank, such as 725, is rotated, in a counter-clockwise direction about its respective fixed center, such as 726, under the influence of its spring 727 and pin 709 secured to the right-hand end of the horizontal arm of the bell crank is admitted through the punched opening. The lower end of the vertical member of the bell crank carries a contact such as 728 which engages with a cooperating contact such as 729 closing the contact. Where an unpunched area corresponding to a particular element in a code combination is presented to its respective pin, the pin is not admitted and the associated contact remains open. Each code combination appearing in each transverse section of the tape will be sensed simultaneously by pins 705 to 709. The pins will be admitted or withheld in accordance with the permutation code combination. The associated contacts will be closed or open in accordance with the code combination. When the raised surfaces on the sensing cams engage their respective followers, the pins will be withdrawn in unison. Thereafter the raised surface on the tape advance cam will engage its follower and the tape will be moved forward to the next transverse position presenting a new combination to the pins.

The enciphering cams

Figure 20:
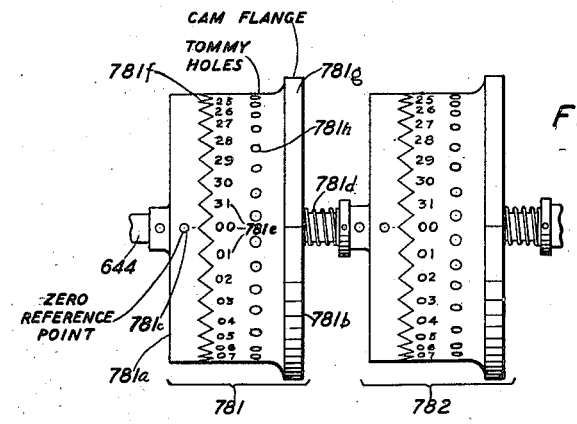
Fig. 20 shows details of the arrangement for changing the settings of the various enciphering cams so as to vary the sequence of the enciphering combinations.

There are four sets of enciphering cams. Each set comprises 5 cams. Refer to Fig. 20 which shows two adjacent cams such as 781 and 782 on shaft 644. Each cam of each set has a driving member such as 781a, which is rigidly secured to its respective cam shaft and an adjustable driven member such as 781b which is rotatable with respect to the shaft. The periphery of the cam flange, such as 781g, is cut to correspond to the pattern of the corresponding cam diagram per Figs. 14 to 17.

A fixed position of reference such as 781C is stamped on the driving member of each cam. The driving member and the driven member engage through corresponding serrations on their respective left and right-hand edges. The members are normally maintained in engagement through the compression of a coiled spring such as 781d. The number of serrations corresponds with the number of positions on the particular cam which are numbered as 781c. Finger holes such as 781h are provided to facilitate setting the cams in the position desired. The driven member, such as 781b, may be disengaged from its driving member by forcing the driven member to the right against the influence of its associated spring, such as 781d. Then the driven member is rotated to the new code position and released to reengage with the driving member.

Reference to Figs. 14, 15, 16 and 17 shows the manner in which the cams are arranged. In Fig. 14, five cams are shown in the developed condition. A cross-hatched area on the cam indicates a raised surface in a corresponding position on the periphery of the cam. A blank area indicates a depressed surface in the corresponding position on the periphery of the cam. Where an area on the periphery of the cam is raised the cam follower for the respective cam, as indicated in Fig. 7, will be depressed.

All of the cams are rotatable each with respect to the other and with respect to the shaft driving the particular set of cams. Each cam is arranged so that the numbers appearing opposite each indicated cam position in Figs. 14 to 17 will appear opposite the corresponding position on the corresponding cam flange. The numbers indicated in Figs. 14 to 17 are the setting numbers which are used to arrange the cams for any given enciphering key series.

Attention is called to the fact that each of the cams in cam sets No. 1 and No. 2 has thirty-two positions numbered 0 to 31, whereas, each of the cams in cam sets Nos. 3 and 4 has thirty-one positions numbered 0 to 30. Secured to the right-hand ends of each of the cam shafts 644 to 647 are dials 654 to 657 respectively. Dials 654 and 655 are each calibrated and marked from 0 to 31. Dials 656 and 657 are each calibrated and marked from 0 to 30.

Each cam set is orientable with respect to its driving shaft such as 640. The driving and driven members of the cam set clutches such as clutch 648 are arranged to engage through serrated edges on the members. The number of serrations on the members of a particular cam set clutch corresponds with the number of cam positions on the particular set as indicated in Figs. 14 to 17. Each cam set may be drawn to the right by means of its corresponding dial such as 654 against the influence of its corresponding spring 653 which is compressed between the driven member and the bearing. The cam set driven shaft such as 644 may be rotated to a new cam set position. When the dial is released the cam set driving and driven members may reengage in the new cam set code position.

Keys obtainable from the cams

The five cams of cam set No. 1 as shown in Fig. 14 are arranged so that each of the thirty-two possible combinations in a 5-element 2-condition code may be obtained from the cams. The cams in cam set No. 2 are also arranged to provide each of the thirty-two possible combinations in a 5-element 2-condition code. It is pointed out, however, that cam No. 1 in cam set No. 1 corresponds to cam No. 5 in cam set No. 2 except that where a raised surface appears on the periphery of cam No. 1 in set No. 1, a depressed surface appears on cam 5 in set No. 2. Similarly, cams 2, 3, 4 and 5 in cam set No. 1 correspond to cams 4, 3, 2 and 1 respectively in cam set No. 2 except that where a surface is raised in one it is depressed in the other. Similarly, cams 1, 2, 3, 4 and 5 in cam set No. 3 correspond to cams 5, 4, 3, 2 and 1 respectively in cam set No. 4 except that where a surface is raised on one it is depressed on the other. In the case of cam sets 3 and 4 it is not possible to obtain each of the thirty-two combinations in a 5-element 2-condition code in a rotation of either cam set alone as there are but thirty-one of the thirty-two possible code combinations on each of these cam sets.

The number of different settings that can be obtained on cam sets 1 and 2 is 32,768, while the number obtainable on cam sets 3 and 4 is 31,744. For any one set, however, there are thirty-two character combinations on cam sets 1 and 2 and 31 character combinations on cam sets 3 and 4.

From the description above of the speed of rotation of the various shafts it should be apparent that shaft 644 rotates once for each thirty-two rotations of shaft 612. In rotating once, the five cams comprising set No. 1 will present thirty-two different code combinations to their respective followers. Cam shaft 645 rotates once while main shaft 612 rotates 1024 times. Shaft 645, therefore, rotates only once while shaft 644 rotates thirty-two times. The code cams mounted on shaft 645, therefore, will present only one code combination to their respective followers during the interval while shaft 644 is rotating through a complete revolution and setting up thirty-two different combinations of the cam followers associated with shaft 644. After a single code combination established on the enciphering cams mounted on shaft 645 is matched with each of the thirty-two code combinations established by the cams on shaft 644, the cams on shaft 645 will be rotated to the next position. From this it should be apparent that each one of the code combinations of cam set No. 2 will be matched successively with each of the thirty-two code combinations established by cam set No. 1. As a result of this, it should be apparent that for a particular setting of each of these two sets of cams it is possible to obtain 32 times 32 (32 × 32) or 1024 different code combinations. Cam sets 3 and 4 are matched in the same manner to provide 31 times 31 (31 × 31) or 961 combinations. The resultant of each set is then matched together to produce the entire key which will have 1024 times 961 (1024 × 961) or 984,064 combinations in the key before it starts to repeat. This number of combinations is sufficient to encipher text punched in a tape for thirty-six hours of continuous traffic at seventy-five words per minute.

As each cam set has approximately 32,000 possible settings, the total number of combinations each comprising 984,064 characters that can be obtained is, therefore, $32,000^4$ or about $9 \times 10^6$.

Gear ratios

As mentioned above the shaft of enciphering cam set No. 1 is geared down from the high speed shaft in the ratio of 32 to 1. That is to say, enciphering cam set No. 1 makes 1 revolution for 32 revolutions of distributor brush arm 101 of distributor 601. As a result of this the cams of cam set No. 1 will rotate through $\frac{1}{32}$ of 360 degrees or 11¼ degrees, while brush arm 101 rotates through a complete revolution. Fig. 18 shows a part of the profile of the enciphering cams of cam set No. 1. One degree on the code cam per Fig. 18, therefore, represents .011 of a second of the revolution of brush arm 101. The cam does not start to rise or fall until .0285 of a second, a little more than 2 degrees on the cam has elapsed and completes its rise or fall within 1 degree or .011 of a second. This brings the rise and fall of the cams within the time space allotted to the transmitter change as shown on the time chart per Fig. 21. The setting points of the cams and dials are arranged so that they are very positive.

Enciphering cam set No. 3 is geared down in the ratio of 31 to 1 as mentioned above, but the rise and fall of the cams take place at the same time as the rise and fall for cam set No. 1. Since cam set No. 2 is geared down from the brush shaft in the ratio of 1024 to 1 while cam set No. 4 is geared down in the ratio of 961 to 1, these cam sets rotate at an extremely low rate of speed. The rate of speed is so slow that it cannot be registered during the transmitter change time. Further it is registered only once for each revolution of cam sets Nos. 1 and 3. In order to insure a positive registration at the proper time the code combinations established by cam sets Nos. 2 and 4, as will appear in the detailed description below, are transferred to separate groups of relays each comprising 5 relays. Cam sets Nos. 2 and 4 are offset with respect to cam sets Nos. 1 and 3 so that they have no tendency to change during the zero conditions of cam sets Nos. 1 and 3.

Figure 19:
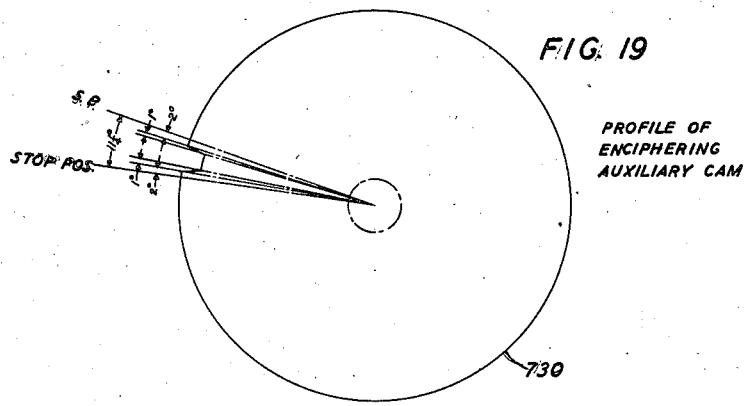

Enciphering cam sets Nos. 1 and 3 are, therefore, each equipped with a sixth or auxiliary cam. These cams are cam 730 which is rigidly secured to shaft 640 of cam set No. 1 and cam 731 which is rigidly secured to shaft 642 of cam set No. 3. Auxiliary cam 730 controls the operation of locking relay 911 in Fig. 9. Locking relay 911 in turn controls the operation of relays 901 to 905 on which the codes established by enciphering cams No. 2 are set up. Similarly, contact 733 associated with auxiliary cam 731 controls locking relay 912 which in turn controls relays 906 to 910 which respond to the code combinations established by cam set No. 4. Cams 730 and 731 are arranged so that each controls its associated contact so that it is open in but one cam position. During this open position of the auxiliary cam contacts, the code combination of the slower speed cams will be transferred to relays 901 to 905 and 906 to 910. When contacts 732 and 733 close, relays 901 to 905 and 906 to 910 will lock and remain locked until contacts 732 and 733 again open. During this interval they are not responsive to the code combinations established by the slow speed cams and the slow speed cams can change into the positions of the succeeding code combinations without affecting their operation. The details of the cam cuttings of an auxiliary enciphering cam such as 730 are shown in Fig. 19.

It is pointed out that as a result of the foregoing described operation the code combinations established on the slow speed enciphering cam sets Nos. 2 and 4 will always be established on their associated sets of relays at the zero positions of their respective high speed cam sets Nos. 1 and 3.

The distributor

Attention is called to the arrangement of distributor 601. The distributor face is equipped with 4 rings. The outer rings 602 and 607 are interconnected by brush 604 and 605 and cooperate as a pair. The inner rings 660 and 661 are interconnected by brushes 662 and 663 and cooperate as a pair. The outer ring comprises 7 segments, namely, a stop segment, a start segment and 5 segments for the 5 elements of the 5-element code combination. The stop position of the brush is 49 degrees in from the left-hand edge of the stop segment instead of the usual 30 degrees of standard teletypewriter transmitting distributors. Ring 602 is a solid continuous conducting ring. Ring 660 is divided into 2 segments, the shorter of the segments subtends the same angle as does the stop segment on ring 607. The longer segment of ring 660 comprises the balance of the ring. Ring 661 is a solid continuous conducting ring which is connected to ground 664. Rings 660 and 661 control certain functions in the circuit in which it is necessary that the timing be quite accurate and for this reason the functions are controlled by distributor rings rather than by cam-driven contacts.

The transmitter

The operation of transmitter 625 in Fig. 7 is so adjusted with respect to the operation of distributor 601 in Fig. 6 that the withdrawal of the sensing pins 705 to 709 does not start until brush arm 101 of the distributor is in engagement with the left-hand portion of start segment 665. Sensing pins 705 to 709 are completely withdrawn, tape 724 is stepped to the next succeeding position and the sensing pins 705 to 709 are again presented to the tape elements for the succeeding code combination during an interval of 25 milliseconds from the time brush 605 of brush arm 101 engages the left-hand edge of the start segment. During this period brush arm 101 will have swept onto segment No. 1 and will have been in engagement therewith for an interval of 7½ milliseconds.

*The count wheel*

As mentioned above, the count wheel mechanism is coupled to the high speed shaft through a reduction of 59 to 1 so that it makes one revolution for each 59 revolutions of the high speed shaft or one revolution in 7.67 seconds at 75 speed. The counting cams 666 and 667 are arranged so that the cams thereon rise or fall in an interval of 1 degree. Count wheel 666 has 9 risers spaced about the periphery of the cam. Cam 667 has one riser. Each wheel controls a single follower to close a single contact. Cam 666 closes contact 669 nine times in one revolution. Cam 667 closes contact 670 once per revolution. Cam 666 controls its follower so as to open and close contact 669 in accordance with the following table:

*Degree position count wheel 666*

| Count wheel 666 riser No. | Brush arm revolution number | Begin to rise | Be risen | Begin to fall | Be down |
|---|---|---|---|---|---|
| 1 | 5 | 23.4 | 24.4 | 28.4 | 29.4 |
| 2 | 11 | 60.0 | 61.0 | 65.0 | 66.0 |
| 3 | 17 | 96.6 | 97.6 | 101.6 | 102.6 |
| 4 | 23 | 133.2 | 134.2 | 138.2 | 139.2 |
| 5 | 29 | 169.8 | 170.8 | 174.8 | 175.8 |
| 6 | 35 | 206.4 | 207.4 | 211.4 | 212.4 |
| 7 | 41 | 243.0 | 244.0 | 248.0 | 249.0 |
| 8 | 47 | 279.6 | 280.6 | 284.6 | 285.6 |
| 9 | 53 | 316.2 | 317.2 | 321.2 | 322.2 |

Cam 667 controls its follower so as to open and close contact 670 in accordance with the following table:

*Degree position count wheel 667*

| Count wheel 667 riser No. | Brush arm revolution number | Begin to rise | Be risen | Begin to fall | Be down |
|---|---|---|---|---|---|
| 10 | 59 | 352.8 | 353.8 | 357.8 | 358.8 |

The information in the above tables is based upon the devotion of 6.1 degrees of the count wheel shaft to 1 revolution of the high speed shaft with 6 degrees' rotation of the count wheel allocated to the operation and release of a contact.

The driven portion of the count wheel mechanism is coupled to the driving portion of the mechanism through clutch 619. The clutch in turn is under control of count wheel clutch magnet 672. When magnet 672 is energized in a manner to be described below the clutch is opened immediately. When the magnet is deenergized the upper and lower portions of the clutch engage and count wheel shaft 626 is rotated clockwise against the tension of spring 668. When the clutch is disengaged, the count wheel shaft 626 is restored to its zero position. The time allotted to the restoring operation is not more than 260 milliseconds.

When the clutch is released, however, the count wheel shaft 626 does not begin to rotate until the rest position of brush 101 is reached. The maximum time required upon the removal of current from the clutch magnet to insure that it will engage at the end of the brush revolution does not exceed 50 milliseconds.

*The clutches*

From the foregoing it is apparent that 5 major clutches are employed in the ciphering system per se as follows:

(1) The main clutch
(2) The brush clutch
(3) The count wheel clutch
(4) The enciphering cam clutch
(5) The transmitter clutch Certain additional features of these clutches will be described at this point.

The main clutch 611 is of a well-known type which engages anywhere when its associated magnet 675 is energized. When magnet 675 is deenergized cam 676 is forced to the right against the compression of spring 677 as follower 678 rides up on the raised cam surface. The inner face of follower 678 engages an abutment 679 on the driven member of the clutch to stop the clutch in a fixed definite position. The relationship of main clutch 611 and brush clutch 615 is such that rotatable brush arm 101 is always stopped in a fixed definite position on distributor 601, known as the stop position. Brush clutch 615, enciphering cam clutch 622 and transmitter clutch 624 are so arranged that when their respective magnets are energized the clutches will not engage until the stop position of the brush is reached. When their magnets are deenergized the clutches will not disengage until the stop position of the brush is reached.

The maximum time required to insure the stopping or starting of a clutch at the brush stop position from the application or removal of the potential to or from the clutch magnet does not exceed 40 milliseconds. As explained above, the count wheel clutch disengages immediately when its magnet is energized. As soon as the count wheel is disengaged from the driving member of the clutch, spring 668 restores the count wheel to the zero position. Whenever the count wheel magnet 672 is deenergized, therefore, the count wheel mechanism will reengage the driven member at the zero position of the count wheel.

*Auxiliary contacts*

In addition to the above-described mechanism associated with the main shaft, a cam 680 is rigidly secured thereto. The cam operates a follower 681 which closes 2 auxiliary contacts 682 and 683 successively. The cam 680 is so arranged that follower 681 remains in engagement with a depressed surface of the periphery of cam 680 until the 143-degree of rotation of the main shaft is reached, when the downward motion of follower 681 starts. Follower 681 is fully depressed in the 159-degree rotation position. Follower 681 starts to rise again at the 332-degree rotation position and has fully risen by the 351-degree of rotation.

The high speed count cam 684 is also rigidly secured to the high speed main shaft 612. Cam 684 actuates a follower 685 to open and close a single high speed count contact 686. Motion of the follower is such that contacts 686 is open at the zero position but is fully closed when shaft 612 has rotated to the 18-degree position. The contact does not start to open until the 261-degree rotation position is reached and is fully opened at the 277-degree position.

The cipher unit is also equipped with a tape lever 740, the function of which is to prevent operation of the mechanism unless a supply of punched tape is being fed into the tape transmitter 625. When there is sufficient slack in tape 724, roller 703 is in a lowered position and the left-hand end of tape lever 740 which rotates about a fixed pivot 741 is in a raised position. When there is not sufficient slack in the tape, roller 703 is raised rotating lever 740 about pivot 741 and opening tape feed contact 742. This, as will be seen below, opens the main clutch to prevent tearing of the tape. The tape lever mechanism is so arranged that contact 742 will open or close due to the increase or decrease of an amount of tape equal in length to the normal distance between successive code combinations in the tape.

Keys, lamps and switches

A two-way key, the code decode key 1101 in Fig. 11, is provided for controlling the ciphering mechanism to function either in encoding or decoding a message. When the key is in the position shown, the mechanism is arranged for enciphering and lamp 1102 is lighted to indicate this condition. When key 1101 is operated to its alternate position, the mechanism is arranged for decoding and lamp 1103 is lighted to indicate this condition.

Key 504 in Fig. 5 is a one-way key which may be operated to connect the keyboard 505 of the perforator transmitter to the line comprising conductors 529 and 530 for communication purposes. Lamp 542 is lighted over an obvious circuit when the keyboard is connected to the line and extinguished to indicate the alternate condition.

Keys 512 and 516 control the connection of the receiving-only teletypewriter 525 or the reperforator 526 or both, depending upon the type of recorded message desired when coding, decoding or receiving from a line. The lighting of lamps 543 and 544 indicates that the typewriter, perforator and the receiving-only teletypewriter respectively, are connected and the extinguishing of the lamps indicates that they are disconnected.

Line key 520 is a two-way key for connecting the enciphering set to the line or arranging it for local use. Lamp 545 is lighted only when the enciphering set is connected to the line.

Start key 1001 in Fig. 10 is a one-way key used for controlling the starting and stopping of the enciphering mechanism in conjunction with the tape lever described above. Key 1001 also controls the restoration of any mechanism which is locked up in the circuit to its normal condition when the key is actuated to the position for stopping the operation of the enciphering mechanism.

Line use

The enciphering mechanism is arranged for use with either a teletypewriter exchange loop or with a private wire loop or for local use only. It is arranged for attended-only teletypewriter exchange operation. It is not arranged for unattended service as such operation is not considered desirable in enciphering service.

Detailed operation of the circuit

Hereinafter follows a complete description of the detailed operation of the enciphering mechanism.

As an introduction to the description of the detailed operation of the systems of Figs. 5 to 13, applicant first will call attention to the circuit apparatus in these figures which perform functions analogous to those described in the introductory schematic per Fig. 1. Relays 821 to 825 in Fig. 8 register the resultant of enciphering cam sets 1 and 2. Cam set 1 comprises cams 781 to 785. Cam set 2 comprises cams 771 to 775. Both sets are in Fig. 7. Relays 831 to 835 register the resultants of cam sets 3 and 4. Cams 761 to 765 comprise cam set 3. Cams 751 to 755 comprise cam set 4. Both sets 3 and 4 also are in Fig. 7. It is pointed out that the relay apparatus in Fig. 9 cooperates in performing these functions. This will be described in detail below. The total number of code combinations which are established on relays 821 to 825 before repetition is 1024, while the total number of code combinations established on relays 831 to 835 before repetition is 961.

The combined resultants of the code combinations of relays 821 to 825 with relays 831 to 835 are registered on relays 811 to 815. Relays 811 to 815 are known as the code resultant relays. Relays 811 to 815 are the source of the ultimate code series and will have a series of 984,064 code combinations registered in them before repetition can take place.

Relays 801 to 806 in Fig. 8 are the next in the series. They are actuated by the contacts of the transmitter pins 711a to 715a. The pins are controlled by the code combinations of the plain text message in tape 724 in Fig. 7. Relays 1111 to 1115 in Fig. 11 are controlled in response to the combination of the code combinations on code resultant relays 811 to 815 and the transmitter relays 801 to 805. The code combinations which are actually transmitted over the line connected to the distributor 601 in Fig. 6 first appear on relays 1111 to 1115. Relays 1011 to 1015 in Fig. 10 the output of which is impressed on the distributor 601 are introduced into the series to provide an overlap so that one character may be transmitted while the following one is prepared. It is pointed out that there are a large number of contacts on each of relays 1111 to 1115. After the code combination to be transmitted to the line is established on relays 1111 to 1115, if these relays have been operated in such a manner that they would transmit a stunt combination to the line, the stunt combination is recognized by chain circuits, conforming to the particular stunts, extending in series through the contacts of relays 1111 to 1115. During the interval while the preceding character which has been transfered from relays 1111 to 1115 to relays 1011 to 1015 is being transmitted, the combination corresponding to the stunt will be modified before transfer to relays 1011 to 1015.

The manner in which the overlap feature functions is as follows: Attention is called to the fact that the face of distributor 601 differs in two respects from the face of the conventional distributor. These differences are: (1) the rest position of the brush is 49 degrees clockwise from the lefthand end of the stop segment instead of the conventional 30 degrees, and (2) there are two pair of rings instead of the usual single pair. Aside from the change in stop position the outer pair of rings is arranged in the conventional manner for the transmission of a 5-element start-stop permutation telegraph code. In the case of the added pair of rings, rings 660 and 661, ring 661 is a solid continuous conducting ring, while ring 660 is divided into two segments. One of the segments, segment 696, as explained above, subtends the same angle as the stop segment on the outer ring. The remainder of the ring is devoted to the second segment. The long segment 697 is used to lock relays 1011 to 1015. When brush 662 is on segment 697 ground is supplied to the upper or locking windings of relays 1011 to 1015. Segment 696 is used to operate relays 1011 to 1015. When brush 662 is on segment 696 relays 1011 to 1015 are completely unlocked and ground is applied through the contacts of relays 1111 to 1115 to transfer the code combination appearing on these relays to relays 1011 to 1015.

Let it be assumed that the system is starting from rest. Motor 608 as well as motors (not shown) of Fig. 5, depending upon the particular arrangement of the apparatus in Fig. 5, are operating. Start key 1011 in Fig. 10 is in the position indicated, and relay 1017 in Fig. 10 is operated over a circuit from ground through contacts $b$ and $c$ of key 1001, winding of relay 1017 and resistance 1033 to battery, operating the contacts of relay 1017 to the positions indicated. Brush 101 is in the rest position as shown on distributor face 601. The cams of code sets 1 to 4 have previously been set to the start of the particular code combination required. The code resultant will be established on relays 811 to 815 in the following manner: Relays 911 and 912 are in the conditions indicated. These relays are under control of relay 1017 as well as the sixth cams 730 and 731 associated with cam sets 1 and 3 in Fig. 6 and the series circuits through the windings of relays 911 and 912 are open at each of these places. A circuit may be traced from ground through contact 911a which extends through conductor 200 in Figs. 9, 8 and 7 to contacts 771a to 775a in parallel where it forms into five parallel branches. Contacts 771a to 775a will be open or closed depending upon the particular code combination established by the code cams of code set 2. Where a particular contact is closed the circuit will be extended through the corresponding conductor of the conductor group 201 to 205 which extend through Figs. 7, 8 and 9, through the top windings of relays 901 to 905 and resistances 921 to 925 to battery. Where a contact of the group 771a to 775a is closed the corresponding relay in the group 901 to 905 will be operated. Where a contact of the group 771a to 775a is open the corresponding relay in the group 901 to 905 will be unoperated. Where a relay of the group 901 to 905 is unoperated a circuit will be established from ground through the $b$ contact of the associated relay which extends through conductors 191 to 195 through Figs. 9, 8 and 7 to contacts 781b to 785b of cam set No. 1. If the surface of a particular cam in cam sets 781 to 785 is raised the corresponding circuit will be extended through conductors 181 to 185 which extends through Fig. 7 into Fig. 8 and through the windings of relays 821 to 825 and resistances 851 to 855 to battery. In response to this where a circuit is closed the armature of the corresponding relay in the group 821 to 825 will be actuated to the left to engage its associated $a$ contact. In the case of such of the relays of relay group 901 to 905 as are operated the corresponding $b$ contact will be open and the corresponding $a$ contact will be closed. Under these circumstances a circuit may be traced from ground through the corresponding $a$ contact and the corresponding conductors in the group 171 to 175 which extend through Figs. 9, 8 and 7 to contacts 781a to 785a on cam set No. 1. Where a surface on any of cams 781 to 785 is depressed the path will be extended through conductors 181 to 185 over a path heretofore traced through the windings of relays 821 to 825 energizing corresponding relays. Under these circumstances the armatures of these relays will again be operated to the left to close their respective $a$ contacts. From the above it may be seen that the code combination established by cam set No. 2 is transferred to relays 901 to 905 and continuous paths may be established from ground through either the $a$ or $b$ contacts of relays 901 to 905 through the contacts of cam set No. 1 provided the $a$ cam contact is closed when the $a$ relay contact is closed, or the $b$ cam contact is closed when the $b$ relay contact is closed.

A circuit may also be traced from ground through contact 912a to conductor 210 which extends through Figs. 9, 8 and 7 to five parallel branches at contacts 751a to 755a associated with cam code set No. 4. The circuits will be extended through such of the contacts as are closed to conductors 211 to 215 which extend through Figs. 7, 8 and 9 to the top windings of relays 906 to 910 and resistances 926 to 930 to battery. Where a circuit is closed the corresponding relay in the group 906 to 910 will be operated and where the circuit is open the corresponding relay will be released. Where a relay is released a circuit will be established from ground through the $b$ contact of the relay to conductors 241 to 245 which extend through Figs. 9, 8 and 7 to the $b$ contacts associated with cams 761 to 765 of code cam set No. 3. Where a particular $b$ contact is closed a circuit will extend to conductors 231 to 235 which continue through Figs. 7 and 8 through the windings of relays 831 to 835 and resistances 861 to 865 to battery. Where a circuit is closed the armature of the corresponding relay in the group 831 to 835 will be actuated to engage its associated $a$ contact. In the case of such of the relays in the group 906 to 910 as are operated the corresponding $a$ contact will be closed. A circuit may then be traced from ground through such of the $a$ contacts of relays 906 to 910 as are closed to corresponding conductors in the conductor group 221 to 225 which extend through Figs. 9, 8 and 7 to the $a$ contacts of cams 761 to 765 of cam set No. 3. In the case of such of these contacts as are closed a circuit will be extended over a path heretofore traced through the windings of relays 831 to 835 energizing the windings and closing the corresponding $a$ contacts. From this it should be apparent that the code combinations established on cam code set No. 4 are transferred to relays 906 to 910. If corresponding $a$ or $b$ contacts on both the relays 906 to 910 and code cam set No. 3 are closed the armatures of relays 831 to 835 will close their respective $a$ contacts. If corresponding contacts on relay group 906 to 910 and their corresponding cams in code cam group No. 3 are not closed the armatures of relays 831 to 835 will engage their respective $b$ contacts. As a result of the foregoing operations the code combinations established on code cam sets 1 and 2 have been combined to control relays 821 to 825 and the code combinations established on code cam sets 3 and 4 have been combined to control relays 831 to 835. The combinations appearing on these two sets of relays are now to be combined to control the code resultant relays 811 to 815 and how this is performed will now be explained.

In order to form a continuous path from ground through particular contacts of relays 821 to 825 and corresponding contacts on relays 831 to 835 to energize the top windings of relays 811 to 815, it is necessary that the armatures of a particular pair of relays such as 821 and 831 be both actuated to corresponding positions. That is to say, if both armatures are actuated as shown in the drawings to the left a circuit may be traced from ground through contacts 831a and 821a in series through the top winding of relay 811 and resistance 871 to battery energizing the top winding of relay 811. If the armatures of relays 821 and 831 are both actuated to the right the circuit will extend from ground through contact 831b and contact 821b through the top winding of relay 811 and resistance 871 to battery energizing the top winding of relay 811. If the armature of one relay of a pair, such as the armature of relay 821, is actuated to the right and the armature of the other relay of the pair, such as the armature of relay 831, is actuated to the left, there will be no continuous path through the top winding of relay 811. Where the top winding of any of relays 811 to 815 is energized, the corresponding armature will be actuated to the left to engage its associated a contact.

The tape is placed in the transmitter and drawn into position such that the first code combination is sensed by pins 705 to 709 of tape transmitter 625. Where pins are admitted through the tape the corresponding a contact is closed. In the case of each one of the transmitting cam contacts which is closed a circuit may be traced from ground through the corresponding a contact of the group 711a to 715a through corresponding conductors of the conductor group 251 to 255 which extend through Fig. 7 into Fig. 8 and through the winding of the corresponding relay of the relay group 801 to 805 to battery operating the relays associated with the closed contact. The code combination appearing in the tape will be set up on the contacts of relays 801 to 805. Attention is called to the fact that in the case of relays 802 to 805 more contacts than can be accommodated conveniently on one relay are required to form chain sensing circuits. Conductors 252 to 255 are therefore multipled through the windings of relays 842 to 845 and resistance 892 to 895 to battery. The reason for this will become apparent below.

Refer now to relays 811 and 801. Let it be assumed that the armature of relay 811 has been actuated to close its a contact. Further let it be assumed that contact 711a is open so that relay 801 is released. Under these circumstances a circuit may be traced from ground through contact 811a, contact 801f and conductor 131 which extends through Figs. 8, 12 and 11 through the windings of relay 1111 and resistance 1131 to battery energizing relay 1111. In the case of each of the relays of relay group 811 to 815 the a contact of which is closed there will be a closed circuit extending through a corresponding relay of the group 1111 to 1115 provided the transmitter relay in the group 801 to 805 is released. If the armature of a relay of the group 811 to 815 engages its respective b contact there will be a closed circuit extending through the winding of a corresponding relay in the group 1111 to 1115 provided the corresponding transmitter relay of the group 801 to 805 is operated. Attention is called to the fact that the a and b contacts of relay 815, instead of being connected directly to the contacts of its corresponding relay 805 of the transmitting relays, is connected instead first through the contacts of relay 806. The reason for this will be explained below.

Start key 1001 in Fig. 10 is now actuated to its alternate position. Relay 1017 is thereupon released as its operating circuit is broken at the b and c contacts of key 1001. A circuit may now be traced from ground 664 in Fig. 6 through ring 661 of distributor 601, brushes 663 and 662, segment 666, and conductor 103 which extends through Figs. 6 and 10, contact 1017c through the a contacts of relays 1018 to 1021 into Fig. 11 where it is formed into five parallel branches at the left-hand armatures of relays 1111 to 1114 and the left-hand contacts of relay 1124. Attention is called to the fact that the left-hand contacts of relay 1124 are connected in series through their respective armatures to the contacts and armatures of relay 1115. The reason for this will be explained below. Where the armatures of relays 1111 to 1115 and 1124 are operated to close their left-hand contacts the parallel branches will be extended through conductors 151 to 155 through Fig. 11 into Fig. 10. Conductor 151 extends through contact 1021d through the bottom winding of relay 1011 and resistance 1023 to battery. Conductor 152 extends through contact 1019d and the bottom winding of relay 1012 through resistance 1025 to battery. Conductor 153 extends through contact 1018d, bottom winding of relay 1013 and resistance 1027 to battery. Conductor 154 extends through contact 1020d, bottom winding of relay 1014, and resistance 1029 to battery. Conductor 155 extends directly through the bottom winding of relay 1015 and resistance 1031 to battery. The code combinations which have been established on the armatures of relays 1111 to 1115 will be transferred to relays 1011 to 1015.

Simultaneously with the operation of key 1001 to its alternate position the main clutch, the brush clutch, the code clutch and the transmitter clutch are controlled so as to start the operation of their associated mechanisms. The manner in which this is performed will now be described. A circuit may be traced from ground through contact 1001a to conductor 122 which extends through Figs. 10, 11 and 7 to tape lever contact 742 in Fig. 7. Provided there is sufficient tape in the tape loop between rollers 702 and 704, tape lever contact 742 will be closed and a circuit will extend through conductor 122 into Fig. 6 and through the winding of main clutch magnet 675 and resistance 690 to battery, energizing magnet 675 which permits main clutch 611 to engage. A circuit may also be traced from battery through resistance 691, brush clutch magnet 600 to conductor 101 which extends through Figs. 6, 10, 11 and 12 and through contact 1202d, contact 1205c, and contact 1221d to ground, permitting brush clutch 615 to engage. Key 1103 is actuated simultaneously with key 1001 establishing a circuit from ground through contact 1103c, winding of relay 1117 and resistance 1109 to battery operating relay 1117. A circuit may also be traced from battery through resistance 693 and code clutch magnet 694 to conductor 114 which extends through Figs. 6, 7, 8, and through contact 1120a, contact 1117b, contact 1116l to conductor 119. Conductor 119 continues from Fig. 11 into Fig. 12 through contact 1201e, contact 1203f and contact 1204a to ground, energizing code clutch magnet 694 and permitting the code clutch to engage. A circuit may also be traced from battery through resistance 400 and the winding of tape transmitter clutch magnet 401 to conductor 119 which extends through Figs. 6, 10, 11 and 12 to contact 1201e, from which point it has been traced to ground at contact 1204a. The transmitting clutch magnet is energized, permitting the transmitting clutch to engage.

As long as brush 605 remains in engagement with stop segment 607 the transmitting circuit through conductors 603 and 606 will remain closed. When brush arm 101 has moved into position so that brush 605 engages start segment 665 the transmitting circuit will be open to send the characteristic start signal of the 5-element start-stop telegraph code. As soon as brush 662 engages segment 660 a circuit will be established from ground 664 through ring 661, brushes 663 and 662 and segment 60 to conductor 102 which extends from Fig. 6 into Fig. 10 where it divides into five parallel branches at the $a$ contacts of relays 1011 to 1015. Such of these relays as have been operated will be locked through their respective $a$ contacts and corresponding resistances of the group 1022, 1024, 1026, 1028 and 1030 to battery.

In tracing the circuit by means of which the codes set up on relays 1111 to 1115 were transferred to relays 1011 to 1015 it was shown that ground for the operation of relays 1011 to 1015 was supplied through segment 696 of distributor 601. As soon as brush 662 sweeps off segment 696 the energizing circuits by means of which relays 1011 to 1015 are operated will no longer be available. This condition will prevail for the major part of a cycle of operations. Relays 1111 to 1115 are therefore in condition so that a new combination may be established for these relays and relays 1011 to 1015 will remain unaffected thereby. Such of relays 1011 to 1015 as were operated by the preceding combination will remain locked and those of them that were unoperated will remain released.

It was shown above that while brush arm 101 was in the stop position conductors 603 and 606 were interconnected through brushes 604 and 605. During the interval while brush 605 is in engagement with segment 665 the transmitting circuit is open. Conductor 606 is connected to conductor 104 which extends into Fig. 10 and connects the five parallel branches at the $b$ contacts of relays 1011 to 1015. In the case of such of these relays as are operated a circuit will be extended through the corresponding $b$ contact of the relay and conductors 105 to 109 to the five character forming segments of distributor 601. As brush 605 engages each of these segments successively, the circuit interconnecting transmitting conductors 606 and 603 will be open or closed depending upon the condition of contacts 1011b and 1015b.

While the code combination corresponding to the first enciphered character is being transmitted the system is free to prepare the succeeding character.

Refer now to Fig. 21 which shows the time chart for straight coding or decoding. On this chart the time intervals allotted for the various operations are indicated. From the chart it is apparent that the transmitter 625 is changed during the interval while the brush is traversing the start segment and a portion of the first of the five character forming segments. As soon as brush 662 enters segment 660 the sensing pins of the transmitter begin to withdraw. They are completely withdrawn, the tape is stepped forward and the pins are again presented to the tape within 30 milliseconds of the start of operations. The group of relays 801 to 805 associated with the tape transmitter then take up the new combination in the tape. Simultaneously with this action the code cams change their position causing the individual code relay groups to take up new combinations. Then the code resultant relays are set. The new combination of code resultant and tape transmitting relays then set up a new combination on relays 1111 to 1115. The new combination is therefore, as is apparent from the chart, available on relays 1111 to 1115 long before the brush reaches the stop segment. This intervening time which has been made available by the overlap system of relays 1111 to 1115 and relays 1011 to 1015 will be used for functions to be described later.

When the brush 605 reaches the stop segment 607 and opens the circuit through segment 660 relays 1011 to 1015 are unlocked and ground is applied through segment 696 to relays 1111 to 1115 which in turn causes relays 1011 to 1015 to take up the new combination present on relays 1111 to 1115. Brush arm 101 will not stop again before the tape runs out and therefore the release and the resetting of relays 1011 to 1015 must take place during the interval while brush 601 traverses segment 696. The relays performing this function must therefore be relatively fast. The operations of the enciphering relays, the transmitter, and the distributor are repeated to encipher each succeeding code combination appearing in the tape until the enciphering mechanism is stopped. The operation of the system for deciphering is the same as described for ciphering except that the tape punched in accordance with the received enciphered code is substituted for the tape punched in accordance with the message text and code combinations corresponding to the message text are produced instead of enciphered code combinations.

*Time chart for basic coding*

Referring to the time per Fig. 21 it will be seen that the total time of a revolution of brush arm 101 at a speed of operation corresponding to seventy-five words per minute is 130 milliseconds. When brush 601 engages segment 660 an interval of 30 milliseconds is required to reset the transmitter. Concurrently with this, the code cams are changed and relays 821 to 825 and 831 to 835 are reset. Then an interval of 20 milliseconds is allotted for the resetting of relays 801 to 805 and 1111 to 1115. Reference to the chart per Fig. 21 indicates that by the time brush 605 has reached the end of the second character forming segment in transmitting the previous character the new character is in place on relays 1111 to 1115. When brush 662 sweeps off segment 660 onto segment 696, 7 milliseconds is allotted for resetting relays 1011 to 1015. Ample time is available therefore to complete the resetting before brush 662 reengages segment 660.

*Plain text transmission*

Attention is called to the fact that it is possible to arrange the mechanism herein so that signal code combinations appearing in the transmitter tape are transmitted without modification by the enciphering mechanism. It will be observed that code resultant relays 811 to 815 are each equipped with two windings. These relays are under control of relay 1117. When relay 1117 is released a circuit may be traced from ground through contact 1117a to conductor 143 which extends from Fig. 11 through Fig. 12 into Fig. 8 where it forms into five parallel branches extending through the bottom windings of relays 811 to 815 and resistances 881 to 885, respectively, to battery, energizing the bottom windings and operating the armatures of these relays so as to engage with their respective $a$ contacts. Under this condition ground is connected through the armature and a contact of each of these relays and through corresponding contacts on the tape transmitter controlled relays 801 to 805 to control the operation of relays 1111 to 1115. From this it should be apparent that the mechanism will not be responsive to the enciphering code cams because notwithstanding the conditions of these cams the armatures of relays 811 to 815 will be unaffected.

During the interval while the mechanism is arranged so that it transmits the code combinations appearing in the tape without modification the code cams are arranged so that they cannot rotate. This is effected by maintaining the code clutch open under control of relay 1117. While relay 1117 is released the circuit which extends through the winding of code clutch magnet 694 and conductor 114 is open at contact 1117b. Under this condition the code cams cannot rotate. When relay 1117 is operated the code clutch is closed and the code resultant relays 811 to 815 are again under control of coding relays 821 to 825 and 831 to 835 and the system is in condition for regular coding. Relay 1117 is under control of the operator by means of a special signal to be explained below.

*Translation of a stunt combination into two non-stunt combinations*

As above mentioned, the system herein is arranged to translate any enciphered signal combination, which results in a stunt combination appearing at random, into two non-stunt combinations. This means that if as a result of combining the code combinations appearing on code resultant relays 811 to 815 with the plain text combinations appearing on relays 801 to 805 a combination is formed on relays 1111 to 1115 which would cause the teletypewriter to perform some one of its stunt functions, the stunt signal combination is changed into two combinations each corresponding to a character instead of a stunt. It is necessary to translate the stunt combination into two letter combinations as all signal combinations must be kept within the limits of the twenty-six letters of the alphabet.

There are six stunt combinations in modern teletypewriter operation as follows: Letters, blank, figures, carriage return, line feed, and space. The letter combinations that have been chosen to represent the stunts are: EL for line feed, EH for space, EO for carriage return, EK for letters, EJ for figures, ET for blank.

Because the letter E is used for the first letter of each of these combinations the letter E must also be considered as a stunt and therefore the letters EZ are transmitted instead of the letter E where the letter E appears in the normal text.

Attention is called to the fact that the combination identifying the second letter of each of the above combinations is the same as the combination for the stunt except that the fifth pulse is changed, that is to say, where the fifth pulse of a stunt combination is a marking pulse it will be changed to a spacing pulse, and vice versa.

For instance, the combination for line feed is — + — — —, where minus represents the space condition and plus represents the marking condition. The second letter of the combination into which the line feed combination is translated, as shown above, is L. The code combination for L is — + — — +. It will be observed that the fifth pulse of the line feed combination has been changed from a minus to a plus while the other four elements remain unchanged. The second letter of each of the other combinations is correspondingly modified.

For instance,

Space ---------- — — + — —      H  — — + — +
Carriage return_ — — — + —      O  — — — + +
Letters --------  + + + + +      K  + + + + —
Figures -------  + + — + +      J  + + — + —
Blank ---------  — — — — —      T  — — — — +
E -------------  + — — — —      Z  + — — — +

In each of the above combinations the condition of the fifth element for each of the stunts and for E shown in the left-hand column has been changed to the opposite condition in forming the substituted letter in the right-hand column.

In order to translate any of the above stunt combinations and the letter E into its corresponding two-letter combinations a cycle of operations extending through three revolutions of brush arm 101 is involved and this will now be described.

It has been explained above that the code resultant combinations appearing on relays 811 to 815 are combined with the transmitter tape combinations appearing on relays 801 to 805 and the enciphered combination first appears on relays 1111 to 1115. When the combinations appear on relays 1111 to 1115 the code combinations identifying the preceding character which has been established and locked on relays 1011 to 1015 is being transmitted by distributor 601. Attention was heretofore called to the fact that relays 1111 to 1115 are each equipped with a large group of contacts. These contacts are arranged in such manner that a number of circuits can be established in series to form a continuous closed path for each different code combination identifying a stunt combination and the combination for the letter E. While the previous enciphered combination is being transmitted by the distributor 601, if a combination which would result in a stunt is established on the contacts of relays 1111 to 1115, the closed circuit through the relay contacts will operate an auxiliary group of relays in such manner as to introduce a combination for the letter E which will first be transmitted. Thereafter the condition of the fifth element of the combination corresponding to the stunt will be reversed so as to translate the stunt combination into the combination for the particular letter forming the second letter of the two-letter combination as indicated above. As part of this operation, it is necessary to stop the tape transmitter 625 and the code cams so as to permit the introduction of the second combination as two combinations are transmitted instead of the single stunt combination.

Reference to Fig. 22 shows the relative times of operation of the different mechanisms involved in this cycle of operations. This will now be described in detail.

During the first of the three revolutions of brush arm 101 of the cycle of operations, the stunt combination corresponding to the preceding enciphered character is transmitted, the stunt code combination appearing on relays 1111 to 1115 is recognized and the code combination for the letter E is established.

Auxiliary contact 682 closes when brush 662 is on segment 660 and the armatures of relays 1111 to 1115 are in position. A circuit may then be traced from ground through contact 682 in Fig. 6 to conductor 118 through Fig. 10 into Fig. 11 where it continues through contact 1117c and contact 1116m to the innermost right-hand armature of relay 1111. From this point the path will be determined by the particular combination which is established on relays 1111 to 1115. For instance, the combination for line feed, as mentioned above, is — + — — —. If this combination is established on relays 1111 to 1115, relay 1112 will be operated and the other relays of the group will be released. Under these circumstances the circuit will extend through contact 1111c, contact 1112c, contact 1113b, contact 1114b, and contact 1115c to conductor 138 which extends from Fig. 11 into Fig. 12 through the winding of relay 1201 and resistance 1216 to battery, operating start relay 1201. When relays 1111 to 1115 are operated in accordance with the combinations for the letter E, for space, for line feed, for carriage return, or for blank, the armatures of these relays will be operated in such a manner that the path extending through the relay contacts terminates directly in conductor 138. The paths for the other combinations will be traced hereinafter.

The operation of start relay 1201 establishes a circuit which may be traced from ground through contact 1201b to conductor 165 which extends from Fig. 12 into Fig. 11 through the left-hand winding of relay 1124 and resistance 1136 to battery, operating relay 1124. The operation of relay 1201 also prepares a locking path which may be traced from battery through resistance 1216, winding of relay 1201 and contact 1201c to contact 1210b which is open at this time for a short interval until contact 683 closes which happens almost instantly after the closure of contact 682 and the operation of relay 1201. When contact 683 closes a circuit may be traced from ground through contact 682, contact 683 to conductor 117 which extends from Fig. 6 through Figs. 10 and 11 into Fig. 12 and through contact 1204e, contact 1203g, contact 1201f, contact 1210d, winding of relay 1210, contact 1207b, and resistance 1222 to battery, operating relay 1210. When relay 1210 operates a circuit may be traced from ground through contact 1210a and contact 1201a to conductor 162 which extends from Fig. 12 through Fig. 11 into Fig. 10 where it continues through the bottom winding of relay 1021 and resistance 1041 to battery, operating relay 1021. The operation of relay 1201 also opens the clutch magnets for the tape transmitter and the code cams. In tracing the path for the energization of the transmitter clutch magnet 401 it was shown to extend through contact 1201e. The path for the energization of the code clutch magnet 694 extended through the same contact. The operation of start relay 1201 opened these paths, deenergizing these magnets and stopping the operation of tape transmitter 625 and the four sets of enciphering cams. The operation of relay 1201 also prepares a locking path for relay 1207 which may be traced from ground through contact 1201d to contact 1207a which is open at this time.

The operation of relay 1210 locks relay 1201 by closing contact 1210b. The operation of relay 1210 would operate relay 1211 at this time over a path from battery, through resistance 1224, contact 1210e and through the winding of relay 1211 to ground, if it were not for the fact that the path through the winding of relay 1211 to ground is short-circuited by the path through contact 1211a, contact 1201f, contact 1203g, contact 1204e, and conductor 117 which extends from Fig. 12 through Figs. 11, 10 and 6 and auxiliary contacts 683 and 682 to direct ground. When relay 1210 operates it locks under control of relay 1207 over a circuit which may be traced from battery through resistance 1222, contact 1207b, winding of relay 1210, contact 1210c, to conductor 156 which extends from Fig. 12 through Fig. 11 into Fig. 10 where it extends through contact 1001a and the start key to ground. As explained above, the reason for stopping the transmitter and code shafts at this time is that these shafts must be prevented from rotating during the next revolution while the code combination for an extra letter, the letter E is introduced. The transmitter and code clutches are arranged to actually stop the rotation of the transmitter and code shafts at the end of their respective revolutions and not when the magnet circuits are actually opened. The code and transmitter shafts will continue to rotate until the brush stop position for this revolution is reached.

When relay 1021, otherwise known as the letter E relay, is operated, contact 1021d is opened. This disconnects the circuit which formerly interconnected contact 1111a and the bottom winding of relay 1011. The bottom winding of relay 1011, when contact 1021c is closed, is connected through the chain circuit extending through the a contacts of relays 1020, 1019 and 1018 to conductor 103 which extends through contact 1017c, through Fig. 10 into Fig. 6 where it connects to segment 696 of transmitter 601. When brush arm 101 is in such position that brushes 662 and 663 connect ground 664 to segment 696, ground will be applied to this circuit. The operation of relay 1021 by opening contact 1021a disconnects the ground which was formerly connected in parallel to the a contacts of relays 1111 to 1115 and 1124. Relays 1111 to 1115 therefore lose control momentarily of relays 1011 to 1015. The auxiliary contact remains closed until brush 662 engages segment 696. Segment 696 applies ground by way of relay 1021, to operate relay 1011. Since ground is disconnected from relays 1111 to 1115, none of the other relays 1011 to 1015 can be operated. The combination for the letter E which, as noted above, is

+ — — — — is established on relays 1011 to 1015. When relay 1021 operates it locks through circuit extending from segment 696 through conductor 103, contact 1021b, top winding of relay 1021 and resistance 1040 to battery. Relay 1124 is also locked from ground 664 through ring 661, brush 663, brush 662, segment 696, conductor 103, from Fig. 6 into Fig. 10, contact 1017c, conductor 103, conductor 157, from Fig. 10 into Fig. 11, through contact 1124c, right-hand winding of relay 1124 and resistance 1137 to battery.

When the auxiliary contact 683 opens, the circuit to ground which short-circuited the path through the winding of relay 1211 to ground is opened and relay 1211 operates. When relay 1211 operates, it prepares a path from the auxiliary contact through contact 1211b which will be used on succeeding closures of the auxiliary contact.

All that is necessary is that relay 1211 be operated before the auxiliary contact again closes. If the brush should stop the time will not enter the next revolution but will elapse during the stop time of the brush.

At the end of the first revolution, therefore, the combination corresponding to the previous enciphered combination has been transmitted and the combination corresponding to the letter E has been established on relays 1011 to 1015 so that it may be transmitted during the next revolution of brush arm 101. It is particularly pointed out that the combination for the letter E was completely established before brush 662 engaged segment 696.

Revolution No. 2

When brush 662 engages segment 660 the combination for the letter E which had been established on relays 1011 to 1015 is locked up on these relays and the combination is transmitted. Attention is called to the fact that the combination for the stunt which appeared on the contacts of relays 1111 to 1115 is still established on the contacts of these relays because the transmitter shaft and the code shaft are at rest. When the auxiliary contact 682 again closes it will reestablish the condition for the reenergization of relay 1201 over the path heretofore traced but since relay 1201 is locked this will have no effect. The closure of the second auxiliary contact 683, however, operates relay 1207. The path for this may be traced from ground through contacts 682 and 683 to conductor 117 which extends from Fig. 6 through Figs. 10 and 11 into Fig. 12 where it continues through contact 1204e, contact 1203g, contact 1201f, contact 1211b, winding of relay 1207 and resistance 1223 to battery. The operation of relay 1207 releases relay 1210 by opening contact 1207b. The release of relay 1210 in turn releases the letter E relay 1021 by opening contact 1210a. The locking path for relay 1021 was previously removed when brush 662 moved off segment 696. When relay 1207 operated it locked over the path from ground through contact 1201d, contact 1207a, winding of relay 1207, and resistance 1223 to battery which was previously prepared by the operation of relay 1201. The operation of relay 1207 also establishes a closed path around contact 1201e which was opened to deenergize the code clutch magnet 694 and the transmitter clutch magnet 401. The closed path around contact 1201e may be traced from conductor 119, through contact 1207c to contact 1203f from which point the circuit to ground is completed as heretofore through contact 1204a. The magnets of the transmitter and code clutches are thus energized but their respective shafts cannot rotate until the brush stop position is reached, as the code and transmitter clutches are designed to start only at the brush stop position as well as to stop only at this position.

Start relay 1201 was operated when the stunt combination appeared on the contacts of relays 1111 to 1115. Since this combination is still present on these relays, relay 1201 is held operated by the stunt combination. Relay 1124 is in turn held operated by relay 1201. Relay 1211 is also maintained operated as relay 1207 is operated.

With the letter E relay 1021 released and relay 1124 operated the condition is such that when brush 601 passes to segment 696 unlocking relays 1011 to 1015, relays 1011 to 1015 will again be under the control of relays 1111 to 1115 and 1124. It will be noted that if the stunt combination registered in relays 1111 to 1115 is such that relay 1115 is released, since relay 1124 is operated, the circuit is arranged so that the effect on relay 1015 is the same as if relay 1115 were operated. Conversely, if relay 1115 is operated the effect on relay 1015 is the same as though relay 1115 were released. This reversal of effect of the condition of relay 1115 is obtained through the interconnection of the a and b contacts respectively and these relays. With relay 1124 operated the circuit extending from conductor 103 through contact 1124a is open at contact 1115a if relay 1115 is operated. If relay 1115 is released the circuit through the a contacts of relays 1124 and 1115 is closed. When, therefore, brush 601 passes to segment 696 locking relay 1124 as before, relays 1011 to 1015 will register the stunt combination that is present on relays 1111 to 1115 with the condition of the fifth element of the combination reversed causing distributor 601 to send the combination representing the second letter of the stunt combination on the next revolution. The stunt letters and the combinations representing them have been listed above.

When auxiliary contact 682 opens at the end of the revolution, relay 1201 releases, in turn releasing relays 1207 and 1211. Relay 1124 will remain locked, however, until brush 601 passes off segment 696. By this sequence of relay operations, the clutch circuit is held continuously closed. Therefore, at the end of the second revolution the code combination for the letter E which is the first of the two letters into which each stunt is translated has been sent and the combination for the second letter of the stunt combination has been set up on relays 1011 to 1015 for transmission during the next brush revolution. Attention is called to the fact that the apparatus is arranged in this condition before brush 601 reaches segment 696.

Revolution No. 3

During the third revolution of the brush, the combination corresponding to the second stunt letter is transmitted. Since the code and transmitter clutches are reengaged their respective shafts rotate. The code resultant relays 811 to 815 are set in accordance with the resultant of the cam combinations; the tape transmitting relays 801 to 805 are set in accordance with the next combination appearing in tape 724. The combinations on each of these two sets of relays are combined and set up on relays 1111 to 1115. Enciphering now proceeds in the normal manner. If another stunt combination appears immediately the process just described will be repeated.

Reference to Fig. 22 shows the relative times of operation of the various apparatus units cooperating in stunt letter transmission for each of the three revolutions of brush arm 101 during the three revolutions in the cycle of operation.

Introduction of space after five characters

In the general description of the operation of the circuit above it was explained that the invention herein is arranged to introduce a space after each five combinations transmitted. This space combination is generated automatically by the apparatus after each five enciphered combinations are transmitted. The manner in which this is performed will now be explained. In order to introduce a space combination after each five enciphered combinations a mechanism is included in the invention herein to count the number of combinations transmitted and identify each fifth combination. As explained above, a count shaft 626 is geared to the high speed shaft 612 through a gear reduction arrangement which steps down the number of rotations so that the count shaft 626 rotates once for each fifty-nine revolutions of the high speed shaft 612. Shaft 626 is equipped with its own individual count wheel clutch 619. Mounted on shaft 626 are two count wheels, Count wheel 666 controls the introduction of the space combination so that a space combination may be introduced after each five other combinations. Count wheel 667 known as the fifty-ninth count wheel identifies the fifty-ninth combination so that the proper combinations may be introduced at this point to adjust the carriage of the receiving device so that the letter corresponding to the next combination transmitted will be typed at the beginning of the next line. This requires the transmission of two code combinations namely the carriage return and line-feed combinations.

As shaft 626 rotates coil spring 668 is tensioned. When the count wheel magnet 672 is energized and separates the driving and driven members of the count wheel mechanism, shaft 626 is immediately restored to its zero position, so that the counting may proceed from the zero position on each cycle of operation of the shaft wheel.

Since a space combination is introduced after each five other combinations are transmitted it is necessary to introduce a space combination after each of the following revolutions of shaft 626: 5, 11, 17, 23, 29, 35, 41, 47 and 53. Count wheel 666 identifies each of these positions. Since the end-of-line combinations must be introduced after the fifty-ninth combination has been transmitted, wheel 667 identifies this position.

The count wheel shaft 626 moves very slowly as compared with the high speed shaft. For this reason another contact, contact 686, under control of high speed count cam 684 on the high speed shaft 612 determines the exact position in a brush arm revolution where the revolution counting mechanism becomes effective. The times of operation of the various apparatus units involved in the space and end-of-line counting is shown in Fig. 23. The count contact on the count wheel 666 becomes effective a short time before the revolution corresponding to the fifth combination is entered. Contact 686 controlled by the high speed count cam closes every revolution but only during the revolutions corresponding to each fifth combination and the fifty-ninth combination does it become effective. Early in each fifth count revolution contact 669 closes. When contact 686 closes, a circuit may be traced from ground through contact 1016B in Fig. 10 to conductor 113 which extends from Fig. 10 into Fig. 6 through contact 686 and contact 669, to conductor 110 which extends from Fig. 6 through Figs. 10 and 11 into Fig. 12 where it continues through the winding of relay 1203 and resistance 1218 to battery, operating relay 1203. The operation of relay 1203 prepares a circuit which extends from contact 1212b, which is open, through contact 1203a to conductor 159 which extends from Fig. 12 through Fig. 11 into Fig. 10 where it passes through the bottom winding of relay 1018 and resistance 1035 to battery. This circuit will be effective when relay 1212 operates to operate relay 1018a. The operation of relay 1203 also prepares a circuit for operating relay 1212 when the auxiliary contact closes. This circuit may be traced from battery through resistance 1225, contact 1208b, winding of relay 1212, contact 1212d, contact 1203b to conductor 117 which has been traced through the lower auxiliary contact 683, which is open at present. The operation of relay 1203 by opening contact 1203g opens the operating circuit of relay 1210 which extends through contact 1201f. The reason for this will be made apparent later. The operation of relay 1203 by opening contact 1203f also opens the circuits through magnets 694 and 400 for the code and transmitter clutches to stop the operation of the mechanism associated with these clutches, while a space combination is introduced. The operation of relay 1203 by closing contact 1203d also prepares a locking circuit for itself which will be effective upon the operation of relay 1212 and the closure of contact 1212C.

*Revolution No. 1*

When auxiliary contact 683 closes ground is supplied to the circuit traced above extending through the winding of relay 1212 and relay 1212 operates. The operation of relay 1212 by closing contact 1212b operates space combination relay 1018 over the circuit traced above. The closure of contact 1212c locks relay 1203. When the fifth count contact 669 opens, relay 1203 will remain locked under control of relay 1212. The energization of code clutch magnet 694 and transmitter clutch magnet 400 will stop their associated shafts at the end of the revolution. When relay 1212 operated, a circuit was established from battery through resistance 1227 and contact 1212f which extended through the winding of relay 1213 to ground but the path through the winding of relay 1213 to ground was shunted at this time by the path through contact 1213a which extends to direct ground through contact 1203 by conductor 117 and the auxiliary contacts 683 and 682. When the auxiliary contacts open, therefore, relay 1213 operates. The operation of relay 1018 performs functions corresponding to those of relay 1021 except that it establishes the combination for space, namely, − − + − − instead of the combination for E, namely, + − − − −. During this revolution the fifth combination of a group of five combinations was transmitted and conditions were established so that the fifth combination would be followed by a space combination. The opening of contact 1018a disconnects the ground supplied through segment 696, conductor 103 and the contacts of relays 1111 to 1115 from the windings of relays 1011 to 1015. The closing of contact 1018C connects this ground through this contact and the bottom winding of relay 1013 and resistance 1027 to battery. Relay 1013 controls the third element of the 5-element code combination. The third element will, therefore, be plus and each of the other elements will be minus in conformity with the code combination for a space.

*Revolution No. 2*

When relays 1011 to 1015 are unlocked, the combination for the space will be set up on these relays. Brush arm 101 will continue to rotate. The combination for a space will be locked on relays 1011 to 1015 and it will be transmitted while the tape transmitter and code shafts are held up and the succeeding enciphered code combination remains established on relays 1111 to 1115.

When the second auxiliary contact 683 closes, relay 1208 operates through contact 1213b. The operation of relay 1208 closes the circuits through the magnets of the tape transmitter clutch and the code clutch so that their associated shafts will start to rotate at the end of the revolution. This function is performed by the closure of contact 1208e which shunts contact 1203f, the opening of which stopped the rotation of these shafts. The object of closing the circuits of the code and tape transmitter magnets by the operation of relay 1208 is to insure ample time for energizing the clutch magnets. The operation of relay 1208 by opening contact 1208b releases relay 1212. This in turn releases relay 1203 and relay 1018. The release of relay 1203 also releases relays 1208 and 1213 and all of these relays are in the normal condition. The sixth character combination is now available to be transferred to relays 1011 to 1015 when the end of the revolution is reached. The opening of the auxiliary contact now causes no action because relay 1203 is released. The release of relay 1203 preceding the release of relay 1208 insures the continuity of the clutch circuit.

Consideration must be given in the introduction of a space signal combination as to its relation to the insertion of a stunt letter combination. This will now be described.

A stunt is the sixth character

If a stunt is the sixth of a group of character combinations it will be recognized as such during the transmission of the fifth character combination. That is to say, while the fifth character combination is being transmitted, the combination for the stunt, if it is the sixth combination, will be present on relays 1111 to 1115. Since the fifth count contact will be closed, relay 1203 will be operated in response to this mechanism as described above. Relays 1201 and 1124 will be operated in response to the stunt combination. In the sequence of operations described above, after relay 1201 operated, first relay 1210 and then relays 1211 and 1207 operated. When the count mechanism and the stunt mechanism function simultaneously, however, when relay 1203 operates, relay 1210 is prevented from operating due to the fact that contact 1203g is open and the operating path for relay 1210 when traced above was shown to extend through this contact.

At the end of the first revolution, relay 1201 will release and when brush 662 passes onto segment 660 in the second revolution, relay 1124 will release.

Revolution No. 2

When the auxiliary contact closes, relays 1201 and 1124 will again operate. After relay 1203 operated, relays 1212, 1213 and 1208 operated in a manner which should be understood from the foregoing. Since relay 1208 is operated, contact 1203g is short-circuited through contact 1208c and relay 1210 can now operate. The operation of relay 1201 further opened the count and transmitter clutches so that they remained open at the end of the revolution. When the auxiliary contact opens, relay 1211 will operate. The code combination for the letter E is now set up and will be sent as the sixth character combination. The second revolution of the introduction of the space becomes the first revolution of the stunt letter insertion. The succeeding revolutions will continue as previously described.

A stunt is the fifth character

Consideration must now be given to the condition wherein a stunt is the fifth character. This means that when the fifth character is being sensed on relays 1111 to 1115 the code combination for the letter E of the stunt is being transmitted as relay 1203 is being operated. In the stunt cycle, relays 1201, 1124, 1210, 1021 and 1211 have been operated and the tape transmitter and code shafts have been stopped. In the fifth character revolution, relay 1203 operates which opens the circuits through the clutch magnets as yet another position and also prevents relays 1210, 1211 and 1207 from making a further count.

In the revolution in which the space is transmitted, relay 1018 supersedes relay 1021. Relay 1208 operates closing the activating path for relays 1210, 1211 and 1207 which causes relay 1207 to operate. This in turn releases relays 1210 and 1211 closing the code and tape transmitter magnets and allowing relays 1021 and 1018 to release. The stunt letter is, therefore, set up as the sixth character. Regular coding will now proceed.

A stunt is the fourth character

If a stunt is the fourth character, there is no interaction between the stunt mechanism and the counting mechanism. The code combination for the letter E will be transmitted as the fourth combination and it will be followed by its associated code combination for the particular stunt as the fifth combination.

Introduction of line feed and carriage return after the fifty-ninth character It has been explained above that a line typed by a teletypewriter receiver connected to the enciphering transmitter herein will consist of 10 five-letter groups, each separated by a space. Fifty-nine code combinations are transmitted in such an arrangement. Then the limit of practical line length is reached. After fifty-nine combinations have been transmitted in accordance with the invention herein, it is necessary to introduce a line feed combination and carriage return combination in the coded message. To make neat copy, the teletypewriter receiver connected to the transmitter herein is arranged so that the line feed inserts a double space between lines. When transmitted over commercial lines enciphered messages are always double spaced. Certain teletypewriter receivers well known in the art are so arranged that in response to a single code combination they make the double line space adjustment so that it is not necessary to transmit two separate combinations. It is contemplated that such a teletypewriter receiver will cooperate with the enciphering code transmitter herein.

On the fifty-ninth revolution, contact 670 will close and a line feed and carriage return combination will be inserted in the following manner. Reference to Fig. 24 shows the relationship of the times of operation of the various apparatus units involved in this operation. Contact 670, the fifty-ninth count contact, closes a short time before the revolution representing the fifty-ninth character combination is entered. Contact 686 controlled by the high speed count cam 684 as explained above closes during every revolution. Only when contact 670 is also closed, however, is it effective to operate the line feed and carriage return mechanism. When both of these contacts are closed, a circuit may be traced from ground through contact 1016b, conductor 113, contact 686 and contact 670 to conductor 111 which extends from Fig. 6 through Figs. 10 and 11 into Fig. 12 where it continues through the winding of relay 1204 and resistance 1219 to battery operating relay 1204. When relay 1204 operates it prepares a path for the operation of line feed combination relay 1019 in Fig. 10 which becomes effective when relay 1212 operates. This path may be traced from battery through resistance 1037 and the bottom winding of relay 1019 to conductor 160 which extends from Fig. 10 through Fig. 11 into Fig. 12 where it continues through contact 1204c to contact 1212b which is open. The operation of relay 1203 also opens the code and tape transmitter clutches by opening contact 1203f through which the energizing paths for magnets 694 and 400 were traced. The operation of relay 1204 also prepares a path for the operation of carriage return combination relay 1020. This path may be traced from battery through resistance 1039, and the bottom winding of relay 1020 to conductor 161 which extends from Fig. 10 through Fig. 11 into Fig. 12 and continues through contact 1204h to contact 1214a which is open at this time. The operation of relay 1204 by opening contact 1204c opens the activating path for relays 1210, 1211 and 1207. When relay 1212 operates under control of the auxiliary contact and closes contact 1212c, relay 1204 will lock through contact 1204e. The operation 1204 also closes a path for operating first relay 1212 and thereafter relays 1213 and 1208. The path for the operation of relay 1212 extends from ground through auxiliary contacts 682 and 683 to conductor 117 which extends from Fig. 6 through Figs. 10 and 11 into Fig. 12 where it continues through contact 1204f, contact 1215c, contact 1212d, winding of relay 1212, contact 1208b and resistance 1225 to battery. This path will not be effective until the auxiliary contacts close. The operation of relay 1204 also connects open contact 1213c through contact 1204g, contact 1214c, winding of relay 1214, contact 1209b and resistance 1228 to battery.

*Revolution No. 1*

When the auxiliary contact closes, relay 1212 operates in turn operating the line feed combination relay 1019. The operation of relay 1212 locks relay 1204 so that when the fifty-ninth count contact 670 opens, relay 1204 will remain locked. As the clutch magnets of the tape transmitter and enciphering code shafts are open, this mechanism will stop at the end of the revolution.

In much the same manner that the letter E relay 1021 set up the code combination for the letter E and the space relay 1018 set up the combination for a space, line feed relay 1019 will set up the line feed combination on relays 1011 to 1015. The opening of contact 1019a disconnects the ground supplied through conductor 103 from the contacts of relays 1111 to 1115. The closure of contact 1019c will supply ground from conductor 103 to the bottom winding of relay 1012. This circuit will be effective when relay 1012 is unlocked to operate relay 1012. The other relays of the group 1011 to 1015 will remain in the released condition. The result will be that the combination set up on relays 1011 to 1015 will be the combination for line feed which is, as shown above, — + — — —. The operation of relay 1019 also establishes a circuit from battery through resistance 1032 in Fig. 10, winding of relay 1016, through contact 1019e to conductor 290 which extends from Fig. 10 through Fig. 11 into Fig. 12 where it continues through contact 1299d to ground operating relay 1016. The closing of contact 1016a establishes a circuit from battery through resistance 1032, contact 1016a, and through conductor 112 which extends from Fig. 10 into Fig. 6 and through the winding of the count wheel restore magnet 672 and resistance 692 to battery, energizing magnet 672. The driven member of the count wheel mechanism disengages from its driving member, then tension spring 668 becomes effective to restore the count wheel mechanism to its zero position. The count wheel mechanism is not permitted to reengage for operation until a later time. Considerable time is available for the restoration of the count wheel. The opening of contact 1016b disconnects ground from the circuit which extends through contact 686 of the high speed count wheel to the fifty-ninth count contact 670 and the fifth count contact 669 in parallel. This prevents these circuits from being effective while the count wheel mechanism is being restored.

At the end of the revolution relays 1213 and 1214 operate in a manner which should be understood from the foregoing description of corresponding relays 1211 and 1212. The operation of relay 1214 by closing contact 1214b locks relay 1204. During this revolution the fifty-ninth character is sent and the line feed is set up.

*Revolution No. 2*

During the second revolution in this cycle, the combination for the line feed is transmitted while the tape transmitter and code shafts are held up. When the auxiliary contact closes relay 1208 operates, releasing relay 1212. The release of relay 1212 in turn releases relay 1019. Relay 1020 is now operated over a path which extends from battery through resistance 1039, bottom winding of relay 1020 to conductor 161 which extends from Fig. 10 through Fig. 11 into Fig. 12 where it continues through contact 1204h, contact 1214a, and contact 1212a to ground. The operation of relay 1020 will continue to hold the count wheel restore magnet energized, by extending the circuit from conductor 112 and contact 1016a through contact 1020e to conductor 290 which extends through contact 1209d to ground. There may be a slight tendency to release the count wheel restore magnet 672 during the transfer from contact 1019e to contact 1020e, but as the count wheel restore clutch cannot reengage before the end of the revolution, the count wheel restore magnet will be reenergized before that point is reached. Relay 1020 is the carriage return combination relay. It corresponds in its functions to the space combination relay 1018, the line feed combination relay 1019 and the latter E combination relay 1021. By opening contact 1020a it disconnects ground supplied through conductor 103 from the contacts of relays 1111 to 1115. By closing contact 1020c it energizes the bottom winding of relay 1014. Since ground is disconnected from the energizing paths of the other relays of the group 1011 to 1015, relay 1014 will be the only one of this relay group which will be energized. The resulting combination will be — — — + — which is the combination for carriage return as shown above. At the end of the revolution relay 1208 and relay 1213 will release and relay 1215 will operate.

During this revolution the combination for the line feed was transmitted and the combination for carriage return was established.

*Revolution No. 3*

During this revolution the carriage return combination is transmitted. The tape transmitter and code clutch magnets are closed and the count wheel is reengaged. The sixtieth character is set up.

When the auxiliary contact closes relay 1209 operates. This in turn releases relay 1214. It is pointed out that the counting relay mechanism associated with the fifty-ninth count circuit is of the 3-revolution type. When relay 1214 releases relays 1020 and 1204 are released. The operation of relay 1209 closed the clutch magnets by short-circuiting open contact 1204a through contact 1209f which reestablished the path to ground. When relay 1204 releases, relays 1209 and 1215 also release. When carriage return relay 1020 released the circuit of the count wheel restore magnet 672 opens and the count wheel mechanism reengages at the end of a revolution.

Revolution No. 4

During the fourth revolution the combination for the sixtieth character is sent and the coding operation continues normally. The sixtieth character is the first character printed on the succeeding line.

A stunt is the sixtieth character

If a stunt is the sixtieth character it will be recognized as such during the transmission of the fifty-ninth character. Relays 1201 and 1124 will operate and release in the manner described above, but their operation and release will be ineffective as relay 1204, which is operated, cuts off relays 1210, 1211 and 1207 and prevents their operation. During the second revolution the same sequence of operation will occur as relay 1204 is still operated.

Revolution No. 3

During the third revolution relays 1201 and 1124 again operate but now relay 1209 operates and recloses the path for the operation of relays 1210, 1211 and 1207. As a result of this relay 1210 operates in turn operating relay 1021. This sets up the combination for the letter E on relays 1011 to 1015. The tape transmitter and code clutch magnets are maintained open. From this point forward the stunt letter insertion takes its regular course, the combination for the letter E being sent as the sixtieth character.

A stunt is the fifty-ninth character

If a stunt combination is the fifty-ninth combination, the combination for the letter E will be in the course of transmission as the stunt combination is recognized as the fifty-ninth character. The operation of relay 1204 will prevent relays 1210, 1211 and 1207 from counting further. Relay 1021 will remain operated but it will be superseded by the line feed combination relay 1019 and the carriage return combination relay 1020.

When the revolution in which relay 1029 operates is reached, relay 1027 will operate releasing relays 1210 and 1021. Line feed relay 1019 and carriage return relay 1018 are thereafter released. Relays 1011 to 1015 will take up the stunt letter combination and regular coding will proceed.

A stunt is the fifty-eighth character

If a stunt is the fifty-eighth character combination there is no interaction between the stunt relay circuits and the count wheel relay circuits. The combination for the letter E will be transmitted in the fifty-eighth position, the combination for the particular letter into which the stunt combination is translated will be transmitted as the fifty-ninth combination and then the line feed and carriage return combinations will be introduced to their normal positions.

Automatic shift from plain text to code

In the coding of a message it is often desirable that the address and signature be in plain text. This expedites the directing of the message to its proper destination. If the coded message is to be transmitted by commercial telegraph companies it is of course necessary that the address be in plain text. In some instances it is desirable that part of the message be in plain text and that part of the message be enciphered. The system of the invention herein is therefore arranged so that when it is in the normal condition it sends plain text. When the mechanism is to be changed so that the text is enciphered a group of character combinations will be punched in the tape immediately preceding the portion of the text which is to be enciphered. In response to this the apparatus of the invention herein will be adjusted so that the code combinations in the tape following the sequence of control characters will be enciphered. When it is desired to readjust the apparatus so that it no longer enciphers the combinations appearing in the tape, a second sequence of code combinations different from the first sequence which effected the transfer from plain text combinations to enciphered combinations will be punched in the tape and in response to this sequence of combinations the mechanism of the invention herein will be readjusted so that it transmits combinations corresponding to the plain text appearing in the tape.

In order to adjust the apparatus of the invention herein so that it changes from the transmission of plain text combinations to enciphered combinations, three code combinations in sequence are punched in the tape, viz., the combination for figures, the combination for the letter S, and the combination for letters. To stop enciphering and readjust the apparatus to transmit combinations corresponding to plain text, a sequence of three combinations, viz., the combination for figures, the combination for the letter H, and the combination for letters are punched in the tape. The combinations for the letters S and H have been chosen to perform these functions because on standard teletypewriters these characters do not print in the upper case. The reason for transmitting the combination for letters as the last combination in each of the sequences is to insure that all of the teletypewriters that may be recording the message will be adjusted so as to print in the lower case which they will do after the reception of this signal. Reference to the time chart per Fig. 25 shows the relationship of the times of operation of the various apparatus units involved in performing the automatic shift function.

When the system is in the normal condition it sends the plain text. It was explained above that when the system was arranged to encipher the text, relay 1117 in Fig. 11 was operated. When plain text is transmitted, it was explained that relay 1117 was released. When relay 1117 is released, it was shown that the armatures of the code resultant relays 811 to 815 were all actuated to engage their a contacts through the circuit which was traced through contact 1117a to ground. While the armatures of relays 811 to 815 engage their respective a contacts the operation of the enciphering relays was ineffective as the code resultant relays 811 to 815 were all locked and when locked ground was supplied through each of them to the contacts of the tape transmitter relays 801 to 805.

With relay 1117 released the count wheel restore magnet 672 is maintained energized from ground through contact 1117g, conductor 158, contact 1016a, relay 1016 being operated, through the winding of count wheel restore magnet 672 and resistance 692 to battery. The count wheel therefore remains at its zero position. Relay 1117 when released, since contact 1117b is open, maintains the path through conductor 114 open so that code clutch magnet 694 is open and the code cams cannot rotate. Let it be assumed now that the operator desires to encipher the text. The operator therefore perforates the message tape in sequence with the combinations corresponding to figures, S and letters.

Attention is called to the tape transmitting relays 801 to 805. These relays are arranged in a manner similar to relays 1111 to 1115 in that in response to the appearance of certain combinations in the tape a number of closed series circuits extend through their relay contacts. These circuits are known in the art as fan circuits. Particular circuits through the fan on relays 801 to 805 will be continuous when the combinations for figures, letters, S or H appear in the tape, that is to say, if any one of these combinations appear in the tape a continuous chain circuit will be established through the contacts of relays 801 to 805. The cooperating relay circuit is so arranged that in order to be effective to change from text to enciphered code the combinations for figures, S and letters must appear in sequence and to change back from enciphered code to plain text the code combinations for figures, H and letters must appear in sequence.

Let it be assumed that the combination for figures appears in the tape. The combination for figures as mentioned above is + + − + +. In response to this relays 801, 802, 804 and 805 will be operated and relay 803 will be released. When the auxiliary contact 682 closes a circuit may be traced from battery through resistance 1312, Fig. 15, right-hand winding of relay 1301 and contact 1302a to conductor 142 which extends from Fig. 13 into Fig. 12 where it connects to conductor 307 which extends from Fig. 12 into Fig. 8, and continues through conductor 845c, 844c, 843b, 842a and 801b to conductor 137 which extends from Fig. 8 through Fig. 12 into Fig. 11 where it continues through contact 1116a to conductor 118 which extends from Fig. 11 through Fig. 10 into Fig. 6 where it continues through contact 682 to ground, operating relay 1301. The closing of contact 683 establishes a circuit from ground through contacts 682 and 683 to conductor 117 which extends from Fig. 6 through Fig. 10 into Fig. 11 where it continues through the top winding of polar relay 1118 and resistance 1121 to ground, actuating the armature of polar relay 1118 to close contact 1118a. With relay 1301 operated and the armature of relay 1118 actuated to engage its a contact, a circuit may be traced from ground through contact 1118a to conductor 144 which extends from Fig. 11 through Fig. 12 into Fig. 13 where it continues through contact 1301a, contact 1307b, winding of relay 1307, contact 1305a and resistance 1315 to battery, operating relay 1307. The operation of relay 1307 closes a locking path for relay 1301 which may be traced from ground through contact 1307a, contact 1301b, left-hand winding of relay 1301 and resistance 1311 to battery. When relay 1301 operates it prepares a path for operating either relay 1303 or relay 1304 should the figures combination be followed by either the combination for the letter S or the combination for the letter H, respectively. This preparatory path extends from battery through resistance 1313 and contact 1301c to the lower terminal of the windings of relays 1303 and 1304 in parallel. This preparation of the paths for relays 1303 and 1304 which respond to the code combinations for the letters S and H, respectively, is necessary because the letters S and H appear in the ordinary text of the message. Unless the combination corresponding to figures precedes each of these combinations, their appearance will be ineffective to control the automatic enciphering mechanism so as to change it from plain text to enciphered text, or vice versa.

It is pointed out that the combination for figures also appears in the ordinary text. When the combination for figures appears during the revolution in which the combination appears relay 1301 will operate, relay 1118 will operate, relay 1307 would operate, and at the end of the revolution relay 1308 would operate. The operation of these relays would not be effective to control the change from text to enciphered code, or vice versa. However, if no combination for the letter H or the letter S appeared following the combination for figures, relay 1305 would operate, releasing relay 1307. At the end of the revolution relay 1305 would release and thereafter relays 1308 and 1301 would release. This would in effect wipe out the operation of the relay mechanism which had responded to the appearance of the figures combination.

Going back to the first registering of the figures combination, relay 1301 and relay 1307 are operated. At the end of the revolution relay 1308 will operate in a manner which should be understood from the foregoing. The operation of relay 1308 provides an additional locking path to ground through contact 1308d for relay 1301. In addition to this the operation of relay 1308 completes a path which may be traced from battery through resistance 1321 and contact 1308a where it connects to conductor 141 which extends from Fig. 13 through Fig. 12 into Fig. 11 where it continues through the middle winding of relay 1118 to conductor 142 which extends from Fig. 11 into Fig. 12 where it connects to conductor 307 which extends into Fig. 8 through contacts 845a, 844c, 843b, 842a and 801a to conductor 137, which extends from Fig. 8 through Fig. 12 into Fig. 11 where it extends through contact 1116a to conductor 118 which extends from Fig. 11 through Fig. 10 into Fig. 6 and through contact 682 to ground. Attention is called to the fact that this circuit extends through the combination which is established in response to the appearance of the figures character on relays 801 to 805. The circuit was also traced through the middle winding of relay 1118. The effect of the current flowing in the middle winding of relay 1118 opposes the effect of the current flowing in the top winding of relay 1118.

The reason for this circuit connection is to allow of two or more figures signals preceding the signal for H or S as operators at times transmit more than one figures signal when a figures shift is desired. If another figures signal should appear in the next revolution the middle winding of relay 1118 will be energized more powerfully and its effect will be in the opposite direction to the effect in the upper winding. Further, it will be energized first and that is the reason for the double contacts on the auxiliary cam. The energization of the middle winding of relay 1118 prevents relay 1118 from operating and thus prevents the count from going forward.

If, however, in the second revolution the combination for the letter S appears, the middle winding of relay 1118 will not be energized and relay 1118 will function normally. At such times if the tape transmitting relays are operated in accordance with the combination for the letter S + − + − − a circuit may be traced from battery through resistance 1313, contact 1301c and the winding of relay 1303 to conductor 140 which extends from Fig. 13 into Fig. 12 where it connects to conductor 308 which extends from Fig. 12 into Fig. 8 through contact 845d, contact 844d, contact 843c, contact 842b and contact 801b to conductor 137 which extends from Fig. 8 through Fig. 12 into Fig. 11 through contact 1116a to conductor 118 which extends from Fig. 11 through Fig. 10 into Fig. 6 and through contact 682 to ground. With contact 1118a closed a circuit may be traced from ground through contact 1118a to conductor 144 which extends from Fig. 11 through Fig. 12 into Fig. 13 where it continues through contact 1301a, contact 1308c, winding of relay 1305 and resistance 1316 to battery, operating relay 1305. The operation of relay 1305 in turn releases relay 1307. The operation of relay 1303 in response to the appearance of the S combination closes a circuit from ground on through contact 1308e, contact 1303d, contact 1309b, winding of relay 1309, contact 1306a, and resistance 1318 to battery, operating relay 1309. Now relays 1303 and 1301 are locked up to relays 1308 and 1309. Relay 1303 operated completes one part of the path for operating relay 1117 and it also completes a part of the path for operating relay 1302. The partially established path for operating relay 1117 extends through contact 1303c to conductor 166 which extends from Fig. 13 through Fig. 12 into Fig. 11 where it continues through the winding of relay 1117 and resistance 1109 to battery. This path is open at contact 1302c. The partially established path for operating relay 1302 extends through contact 1303a to conductor 145.

At the end of this revolution when relay 1118 releases, relay 1305 will release in turn releasing relay 1308 and permitting relay 1310 to operate. Relays 1303 and 1301 are locked to relays 1309 and 1310.

In the third revolution the combination for letters + + + + + appears. In response to this the letters combination relay 1302 operates. The path may be traced from battery through resistance 1314, winding of relay 1302 and contact 1303a to conductor 145 which extends from Fig. 13 into Fig. 12 where it connects to conductor 306 which extends from Fig. 12 into Fig. 8 through contacts 845b, 844b, 843a, 842a and 801b to conductor 137 from which point the circuit has been traced to ground on the auxiliary contact. On this revolution the closing of contact 1118a operates relay 1307. At the end of this revolution when relay 1118 releases, relay 1308 operates, in turn operating relay 1306 and releasing relay 1309.

The fourth revolution is now entered and when the auxiliary contact closes relay 1305 operates releasing relay 1307. It will be noted that this is the first time after relay 1302 has operated that relay 1305 is operated. A circuit is now established to operate relay 1117 from ground through contact 1305c, contact 1302c and contact 1303c to conductor 166 which has been traced through the winding of relay 1117. The operation of relay 1117 by opening contact 1117a opens the circuit which has heretofore been traced through conductor 143 and the bottom windings of code resultant relays 811 to 815 in parallel which served as a locking circuit for these relays by means of which the code resultant relays 811 to 815 were made non-responsive to the enciphering cams.

Now that the locking circuit has been opened the code resultant relays 811 to 815 will respond to the enciphering cams. The operation of relay 1117 also releases the count wheel clutch 672 by opening contact 1117g. The operation of relay 1117 also operates the code clutch by closing contact 1117b. At the end of the revolution these clutches will engage and enciphering will start in the fifth revolution.

Let it now be assumed that the sequence of combinations corresponding to Figures, H and Letters appears in the tape which is to operate the mechanism of the invention herein so that it no longer enciphers the text combinations. The operation of the circuit is essentially the same as described above and the differences only will be explained. In response to the combination for the letter H, − − + − + a chain circuit will be established through particular relay contacts of the tape transmitting relays 801 to 805 to operate relay 1304 which is the H combination relay instead of relay 1303 which is the S combination relay. This circuit may be traced from battery through resistance 1313, contact 1313c and the winding of relay 1304 to conductor 139 which extends from Fig. 13 into Fig. 12 where it connects to conductor 301 which extends from Fig. 12 into Fig. 8 through contact 805a, contact 804a, contact 803a, contact 802a, and contact 801a to conductor 137 which extends as has been shown to ground on the auxiliary contacts.

During the fourth revolution in the sequence for Figures, H, Letters, relay 1305 will operate and establish a circuit from ground through contact 1305c, contact 1302c and contact 1304c to conductor 167 which extends from Fig. 13 through Fig. 12 into Fig. 11 where it continues through the winding of relay 1120 and resistance 1141 to battery, operating relay 1120. When contact 1120a is opened the code clutch magnet is opened. When contact 1120b is opened, enciphering control relay 1117 is opened. At the end of this revolution when relay 1118 releases, relays 1305, 1308, 1306 and 1310 release, releasing relays 1301, 1304 or 1303 depending upon which was operated and 1302 and if relay 1120 is operated it releases.

When the apparatus of the invention is to be arranged for enciphering, the train of three signal combinations for Figures, S, Letters, which starts the coding is transmitted as plain text combinations. There is no interaction in this case with stunt combinations, etc. But when the train of combinations Figures, H, Letters is transmitted to terminate enciphering and to start plain text it is transmitted as enciphered combinations. There may, therefore, be interaction with the apparatus which controls stunt combinations and with the apparatus which controls the introduction of space, line feed and carriage return combinations. The invention herein provides for such operation.

If in the coding of Figures, H, Letters, stunt combinations appear on relays 1111 to 1115, it is necessary that these stunt combinations be translated into their respective two-letter combinations and completely transmitted before relay 1120 is permitted to operate and cause the equipment to revert to plain test. The circuit performs this function in the following manner.

Relay 1118 is equipped with a third or bottom winding. If in any one of the steps involved in coding the Figures, H, Letters combinations, a stunt combination appears on relays 1111 to 1115, the corresponding chain circuit through the contacts of relays 1111 to 1115 is extended through the bottom winding of relay 1118 to prevent the closing of contact 1118a. The circuit extends from ground through auxiliary contact 682, which is the first of the two auxiliary contacts to close, to conductor 118 from Fig. 6 through Fig. 10 into Fig. 11 where it continues through contact 1117c, relay 1117 being closed at such time, to two parallel branches. One branch extends through contact 1116m to the right-hand innermost armature of relay 1111. The second branch extends through contact 1116d to the right-hand outermost armature of relay 1111. Depending upon which of the stunt combinations is established on relays 1111 to 1115, either of these two circuits will be closed through one of a number of paths through the relay contacts. In the case of the stunt combinations for the letter E, for space, for line feed, for carriage return, or for blank all paths terminate in conductor 138. From this conductor the circuit extends through resistance 1123, bottom winding of relay 1118 and resistance 1122 to battery. In the case of the stunt combination for Figures, the circuit extends from contact 1116d through corresponding contacts on relays 1111 to 1115 and through contact 1116g which connects to conductor 138. In the case of the combination for Letters the circuit extends from contact 1116d through corresponding contacts on relays 1111 to 1115 and through contact 1116j also to conductor 138. From conductor 138 the circuit follows the path traced above through the bottom winding of relay 1118. Thus, for any of these conditions, contact 1118a will be maintained open. Attention is called to the fact that the closure of contact 682 before 683 insures that relay 118 will not engage its a contact and delays the subsequent operation of those relays in Fig. 13 which depend upon ground from relay 1118, once a stunt appears in this sequence.

The stunt coding, however, proceeds. The combination for the letter E is inserted. At the end of the revolution in which the combination for the letter E is established relay 1211 operates. Relay 1211 when operated short-circuits the bottom winding of relay 1118. The circuit may be traced from the left-hand terminal of the bottom winding of relay 1118 through conductor 168, through contact 1211d and conductor 169 to the right-hand terminal of the bottom winding of relay 1118. The bottom winding of relay 1118 is, therefore, deenergized. As a result of this when the auxiliary contact again closes contact 1118a will close. Then the circuit may continue to function in the manner described above in response to the Figures, H, Letters, sequence of combinations. This arrangement insures that if stunt combinations are produced in enciphering the combinations for Figures, H, Letters, the two-letter combination for the stunt will be introduced and transmitted.

It is also necessary to provide for the condition whereunder during the coding of the sequence of combinations for Figures, H, Letters, a space, line feed or carriage return combination must be introduced in its proper sequence.

To care for this condition, when either the 1203 or 1204 relays are operated to introduce a space or line feed and carriage return combinations, respectively, a circuit will be established to hold the armature of relay 1118 in engagement with its contact 1118b. This circuit may be traced from ground through contact 1203c, or from ground through contact 1204b, in parallel, through resistance 1240 and then through conductor 168 from Fig. 12 into Fig. 11 where it extends through the bottom winding of relay 1118 and resistance 1122 to battery. Then in the case of a space insertion, when the cycle is advanced to the point where relay 1213 operates, the bottom winding of relay 1118 will be short-circuited through the connection of conductors 168 and 169 through contacts 1213d and 1203h. Then as relay 1118 may respond to the closings of the auxiliary contact the operation in response to the sequence of combinations for Figures, H, Letters may continue.

In the case of the line feed carriage return insertion, the cycle of operations will be permitted to advance until relay 1215 operates at which time the bottom winding of relay 1118 will be short-circuited by the interconnection of conductors 168 and 169 at contact 1215e and the Figures, H, Letters count will continue.

Decoding

In decoding it is necessary to reverse all of the processes that take place in the enciphering operation.

It is to be understood that this system is not designed to decode enciphered messages directly from the line without first preparing a tape in accordance with the enciphered combinations. The enciphered message may be received directly on the apparatus of this invention in the form of a perforated tape. Or a tape perforated in accordance with the enciphered combination may be made in another perforating machine and the tape may thereafter be mounted on supply reel 701 in Fig. 7 herein and be employed to reproduce the original text. The message may be received over commercial telegraph company lines as a typed enciphered message. In such case a perforated tape will first be made from the typed enciphered message and the tape perforated in accordance with the enciphered combinations will be mounted on supply reel 701 to control the mechanism of the invention to reproduce the original text.

When the apparatus of the invention herein was arranged for enciphering, key 1101 was in the condition shown on Fig. 11. When the apparatus of the invention is to decipher enciphered combinations, key 1101 is actuated to its alternate position. This operates relay 1116 over an obvious circuit. The operation of this relay opens the energizing path for certain of the enciphering circuits and closes others as necessary for the enciphering to deciphering change. It also adjusts the clutch circuits so that proper combinations of clutches will be operated at the proper times. These functions will be understood from the following.

The tape perforated with the enciphered combinations is placed on reel 701 and the first combination is set over the sensing pins 705 to 709 of the tape transmitter. The settings for the code cams will be established by prearrangement at the same positions as were used in enciphering the original text. The enciphered combinations will be established on relays 801 to 805. The enciphering code resultant will appear on relays 811 to 815. The two combinations will be combined and the plain text will appear on relays 1111 to 1115. This is a simple reversal of the enciphering process. It should be understood from the introductory explanation above.

Deciphering stunt signals

The relationship of the times of operation of the various apparatus units involved in the deciphering of stunt signals is shown on Fig. 26.

It has been explained that each randomly appearing stunt combination is translated into two combinations. The first combination is always the combination for the letter E. When the combination for the letter E appears on relays 801 to 805 it indicates that a random stunt combination is to be decoded. Extending through the tape transmitter relay contacts is a path which is closed when the combination for the letter E appears. When this particular path is closed it identifies the combination for the letter E. During the revolution in which the combination for the letter E is identified, when the auxiliary contact closes, a circuit is established to operate relay 1202. The code combination for the letter E is + — — — —. The contacts of relays 801 to 805 and their associated relays 842 to 845 will be arranged to establish a continuous path to identify this combination. The circuit may be traced from ground through auxiliary contact 682, conductor 118, contact 1117C, (contact 1116b) conductor 136, contacts 801D, 842C, 843D, 844E, 845E, conductor 309, winding of relay 1202 and resistance 1217 to battery operating relay 1202. The operation of relay 1202 in turn operates relay 806 over a circuit which may be traced from ground through contact 1202C, conductor 303, right-hand winding of relay 806 and resistance 897 to battery operating relay 806. The operation of relay 1202 also operates relay 1210 over a circuit which may be traced from ground through second auxiliary contact 683, conductor 117, through contact 1202a, contact 1210d, winding of relay 1210, contact 1207b and resistance 1222 to battery.

When relay 1202 operates it opens the code cams clutch magnet 694 and the distributor brush clutch magnet 600. When key 1101 and relay 1116 are operated, brush clutch magnet 691 and code clutch magnet 694 are connected through contact 1202d to the same ground circuit. When contact 1202d is opened both magnets are deenergized. The circuit may be traced from ground through contacts 1206d, 1205c, 1202d and conductor 101 to parallel branches. One branch extends through brush clutch magnet 600 and resistance 691 to battery. The other branch extends through contacts 1116k, 1117b and 1120a to conductor 114 which extends through code clutch magnet 694 and resistance 693 to battery. At the end of the revolution the distributor brush 101 and the code cams will stop. The operation of relay 1210 locks relay 1202 through contacts 1210b and 1202b.

At the end of this revolution, relay 1211 operates as heretofore described. The operation of relay 1211 locks relay 806 from ground through contact 1211c, conductor 304, contact 806a, left-hand winding of relay 806 and resistance 896 to battery.

In the second revolution, during which only the tape transmitter is moving, the combination for the letter E is discarded. Then the combination for the second letter into which the stunt has been translated appears and is established on the tape transmitter relays. It will be recalled that the combination for the second letter is the same as the combination for the particular stunt which appeared at random in the tape except that its fifth element has been reversed. This combination for the second letter must now be translated into the corresponding stunt combination before it is modified by the enciphering cams to reproduce the original letter in the text. When this mutilated stunt combination appears on the tape transmitter relays with relay 806 operated, because relay 806 in effect reverses the contacts of relay 805, the result is as though relay 805 were in the opposite position. The fifth element of the code combination will be reversed. The resultant combination on relays 801 to 806 will be the original random stunt combination. When this combination is combined with the original resultant enciphering combination on relays 811 to 815 by which it was originally modified the corresponding plain text combination will be established on relays 1111 to 1115.

When the auxiliary contact again closses relay 1207 will operate releasing relay 1210. When relay 1207 operates the distributor brush clutch and enciphering cam clutch magnet circuits will again be closed as contact 1207e short-circuits open contact 1202d. The clutches will reengage at the end of the revolution. Relay 1210 released will release relay 1202 as contact 1210b opens. Relay 806 is locked by contact 1211c in order to hold it operated until the text combination has been transferred to relays 1111 to 1115 and been picked up by the ground through segment 696 and the contacts of these relays and the combination has been properly registered.

The locking circuit for relay 806 may be traced from ground 664 through ring 661, brushes 663 and 601, segments 696, conductor 103, contact 1017c, conductor 103, conductor 157, conductor 304, contact 806a, left-hand winding of relay 806 and resistance 896 to battery.

At the end of this revolution relay 1207 releases, releasing relay 1210. Relay 806 releases when the brush 601 passes to segment 661 in the next revolution.

During the deciphering of a two-letter stunt combination, the combination for the second stunt letter at times does not immediately follow the combination for the letter E. This is the case when a combination for a space or the combinations for line feed and carriage return are inserted between the combination for the letter E and the combination for the second stunt letter.

In such cases relay 806 is locked to segment 696. The brush arm 101 is not being rotated while the combination for the space or the combinations for line feed and carriage return are being discarded. Relay 806 will, therefore, remain locked in position until the second of the letters into which the stunt combination has been translated appears.

*Suppression of a space*

The combination for a space was inserted by the mechanism of the invention herein when it was in the transmitting condition for the sole purpose of dividing the coded message into five-letter words. In decoding, therefore, the space is simply discarded in the following manner. Reference is made to the time chart per Fig. 27 which shows the relationship of the times of operation of the apparatus involved in the suppression of a space combination and line feed and carriage return combinations.

When a space combination — — + — — appears in the tape 724 and is set up on the tape transmitter relays 801 to 805 and 842 to 845, it closes a path which may be traced from battery through resistance 1220 in Fig. 12 and the winding of relay 1205 to conductor 305 which extends into Fig. 8 and through a closed chain circuit which has been established in response to the appearance of the stunt of the space combination.

This circuit continues through contacts 805a, 804a, 803d, 802c and 801c to conductor 136 from which point it extends through a circuit heretofore traced which passes through auxiliary contact 682 to ground. This path will be available when the auxiliary contact closes.

When contact 1205c opens, brush clutch magnet 600 and code clutch magnet 694 are deenergized stopping their associated mechanisms. The closure of contact 1205a operates relay 1212. The closure of contacts 1204d and 1212c locks relay 1204. When the auxiliary contact 682 opens, relay 1213 operates.

In the second revolution of this cycle when contact 682 closes, relay 1208 operates and releases relay 1212. The operation of relay 1208 by closing contact 1208a short-circuits contact 1205c, the opening of which stopped the distributor brush and the code cam mechanisms. The release of relay 1212 releases relay 1204. The distributor and enciphering cam mechanism will, therefore, start to reoperate at the end of this revolution. At the end of the revolution also relay 1208 will release in turn releasing relay 1213.

What has happened during this revolution is that the distrbutor brush and the code cams have been stopped while the transmitter 625 has progressed. The effect of this is to discard the first combination and set up the combination for the next character. Regular decoding will thereafter proceed.

Suppression of line feed and carriage return combinations

When the combination for line feed — + — — — appears in the tape, a circuit will be established from battery through resistance 1221 and the winding of relay 1206 to conductor 302 which extends from Fig. 12 into Fig. 9 where is continues through contacts 805b, 804b, 803b, 802b and 801c to conductor 136 which extends from Fig. 8 through Fig. 12 into Fig. 11 where it continues through contacts 1116b and 1117c to conductor 118 which has been traced through auxiliary contact 682 to ground when the auxiliary contact is closed. Relay 1206 will operate. This provides a path from ground through the lower auxiliary contact 683 and conductor 117 through contact 1206c, contact 1215c, contact 1212d, contact 1208b and resistance 1225 to battery operating relay 1212. The operation of relay 1206 by opening contact 1206d stops the operation of the distributor and code cam mechanisms. The closing of contacts 1212b and 1206e locks relay 1206. The locking contact 1212c is multipled to the open contact 1214b. The operation of relay 1221 connects open contact 1213c through contact 1206g to contact 1214c. At the end of the revolution, relay 1213 operates in turn operating relay 1214.

During the second revolution the line feed signal combination is discarded and the combination for carriage return appears on the tape transmitter relays. The combination for carriage return — — — + — holds relay 1206. The circuit may be traced from battery through resistance 1221, winding of relay 1206, conductor 302, contacts 805c, 804c, 803c, 802c and 801c from which conductor it has heertofore been traced to ground through auxiliary contact 682. In response to the combination for carriage return relay 1206 will be held operated but the carriage return combination is locked from relays 1212 and 1214.

The closure of the auxiliary contact operates relay 1208 and releases relay 1212. At the end of this second revolution relay 1208 releases releasing relay 1213 which causes relay 1215 to operate.

In the third revolution when the auxiliary contact closes, relay 1209 operates releasing relay 1214 in consequence releasing relay 1206. Relay 1209 operated, closes contact 1209c which supplies ground to the distributor and code cam clutches short-circuiting open contact 1206d. The distributor and code cam mechanisms will start at the end of this revolution.

When the auxiliary contact opens, relay 1209 will release in turn releasing relay 1215.

In this revolution the carriage return signal combination has been discarded and the combination for the next code has been established. Regular decoding is thereafter resumed.

Automatic shift from plain text to code

In deciphering as in enciphering, provision must be made to care for the condition wherein part of the message may be in plain text and part may be enciphered. Therefore, when the apparatus is in the receiving condition, first relay 1117 is in the released condition. It will be recalled that relay 1117 was in the released condition when the system was arranged for transmitting and plain text was being set up. When the combination for figures, S, letters appeared, the system was arranged for enciphering and when the sequence of combinations for figures, H, letters appeared, the system was arranged for the plain text to follow. When the system is arranged for receiving, it operates in the same manner for the change to and from plain text except that in receiving, the plain text appears on relays 1111 to 1115 instead of on the tape transmitter relays 801 to 805. Therefore, the fans on relays 1111 to 1115 will be employed in adjusting the system. Provision has been made for the condition wherein the sequence of combinations for figures, H, letters, which is in code, may have stunt combinations to represent these characters. Also there may be a space combination or line feed and carriage return combinations introduced between the combinations of the sequence. The circuit is, therefore, arranged so that when a combination for the letter E, space, line-feed, or carriage return is present in the transmitter fan relays, relay 1118 will be prevented from operating which will result in holding up the figures, H, letters cycle during the revolutions in which the former combinations appear. The revolution count will, therefore, be effective in controlling its associated group of relays in Figs. 12 and 13 only during significant revolutions.

What is claimed is:

1. In a permutation code teletypewriter signal enciphering system, a permutation code signal enciphering transmitter, a teletypewriter receiver, a single transmission channel only interconnecting said transmitter and said receiver, means in said transmitter for producing permutation code teletypewriter receiver stunt signal combinations at random, means in said transmitter for preventing the transmission of said stunt signal combinations in a form to operate said receiver at random, means in said transmitter for producing other permutation code stunt signal combinations in an ordered sequence and means in said transmitter for transmitting said other stunt signal combinations from said transmitter over said single channel to said receiver so as to control said receiver in a manner to type neat copy.

2. In a permutation code teletypewriter signal enciphering system, a mechanism for producing trains of permutation code signal combinations for enciphering trains of permutation code teletypewriter text signal combinations, a plurality of cams in said mechanism for establishing said enciphering combinations, means for operating said cams at a first time so as to produce enciphering combinations in synchronism with said text combinations and means for stopping the operation of said cams at a second time for an interval while a single one of said text combinations only is produced.

3. A permutation code teletypewriter signal enciphering mechanism, means therein for producing a stunt code signal combination at random at a first time, means in said mechanism for producing a character code combination at random at a second time, means in said mechanism for translating said stunt combination into a particular corresponding character combination, a teletypewriter receiver, a single two-wire transmission circuit, only, interconnecting said mechanism and said receiver and means for impressing all of said character combinations directly on said receiver through said single circuit.

4. In a permutation code teletypewriter signal enciphering transmitter, means for enciphering message text permutation code signal combinations, means for producing both character and stunt permutation code signal combinations at random in response to said enciphering, means for identifying said stunt combinations as they are produced, means for translating said stunt combinations into character combinations, means for establishing all of said character combinations on a telegraph transmitter, and means for transmitting all of said character combinations to a teletypewriter receiver over a two-wire circuit interconnecting said transmitter and said receiver.

5. A permutation code teletypewriter signal enciphering system, a message text permutation code teletypewriter signal combination transmitter therein, a permutation code teletypewriter signal combination enciphering mechanism connected to said text transmitter, means for generating random trains of permutation code teletypewriter signal combinations in said enciphering mechanism, means interconnecting said text transmitter and said mechanism for modifying said combinations produced in said text transmitter by combining them with said combinations produced in said enciphering mechanism to produce enciphered permutation code teletypewriter signal combinations, means in said modifying means for producing enciphered combinations corresponding to both characters and receiving printer stunts at random among said enciphered combinations, a cipher transmitter, means for transmitting said enciphered combinations corresponding to characters from said cipher transmitter directly as they appear, without modification, means for modifying each of said combinations corresponding to random stunt combinations by translating said stunt combinations into two character combinations before impressing them on said cipher transmitter, a receiving teletypewriter, a single two-conductor transmission circuit only interconnecting said receiving teletypewriter and said cipher transmitter, and means for transmitting all of said character combinations directly from said cipher transmitter through said single circuit to said receiving teletypewriter.

6. In a permutation code teletypewriter system, a teletypewriter enciphering transmitter, a teletypewriter receiver, a single circuit having no more than two conductors interconnecting said transmitter and said receiver, means in said transmitter for enciphering permutation code signal combinations, means in said transmitter for producing randomly appearing enciphered permutation code signals corresponding to character combinations and randomly appearing enciphered permutation code signals corresponding to teleptypewriter receiver stunt combinations and means responsive to the production of said combinations for transmitting ordered enciphered character combinations and ordered enciphered stunt combinations directly from said transmitter over said single circuit to said receiver so as to produce a neat printed page of enciphered message in said receiver.

7. In a permutation code teletypewriter signal enciphering system, a teletypewriter signal enciphering transmitter, a teletypewriter signal receiver, a single signal transmission channel only interconnecting said transmitter and said receiver, means in said transmitter for randomly enciphering text code combinations, means in said transmitter responsive to said enciphering for producing randomly appearing character code combinations and randomly appearing receiver stunt code combinations means in said transmitter for transmitting said randomly appearing character code combinations over said circuit as they are produced, without modification, means in said transmitter for translating said randomly appearing stunt combinations into non-stunt combinations to prevent their transmission at random over said circuit to said receiver, means in said transmitter for transmitting said enciphered combinations over said circuit directly from said transmitter to said receiver in equal numbered groups of combinations, and means in said transmitter for introducing a space combination between successive groups of combinations.

8. In a permutation code teletypewriter signal enciphering system, a permutation code telegraph signal enciphering transmitter, a teletypewriter receiver, a single transmission channel only interconnecting said transmitter and said receiver, means in said transmitter for producing randomly appearing enciphered code signal combinations including both character forming combinations and teletypewriter receiver stunt combinations, means in said transmitter for translating each of said stunt combinations normally into two successive character forming combinations, means in said transmitter for introducing a space combination between successive groups of equal numbers of enciphered combinations, means in said transmitter for separating said two character forming combinations at times by a space combination to maintain a uniform number of characters in said groups and means for transmitting said groups of enciphered combinations over said single channel from said transmitter directly to said receiver.

9. In a permutation code teletypewriter signal enciphering system, a teletypewriter signal enciphering transmitter, a teletypewriter receiver, a single transmission channel only interconnecting said transmitter and said receiver, means in said transmitter for producing randomly occurring permutation code teletypewriter receiver stunt signal combinations and means in said transmitter for translating said combinations into different combinations before transmission over said single channel to said receiver.

10. In a permutation code teletypewriter signal enciphering system, a teletypewriter signal enciphering transmitter, a teletypewriter receiver, a single transmission channel only interconnecting said transmitter and said receiver, means in said transmitter for producing randomly occurring permutation code teletypewriter receiver stunt signal combinations, means in said transmitter for translating each of said combinations into two other combinations, each of which other combinations is other than a stunt combination, and means for transmitting said translated combinations directly from said transmitter over said single channel to said receiver.

11. In a permutation code teletypewriter signal enciphering system, a teletypewriter signal enciphering transmitter, a teletypewriter receiver, a single transmission circuit only interconnecting said transmitter and said receiver, means in said transmitter for producing randomly occurring permutation code teletypewriter receiver stunt signal combinations, means in said transmitter for translating each of said stunt signal combinations into two other permutation code signal combinations, each of which other combinations is other than a stunt signal combination, means in said transmitter for introducing a permutation code space signal combination at times between said two other combinations, and means for transmitting said two other combinations and said introduced space combination over said single circuit directly from said transmitter to said receiver.

12. In a permutation code teletypewriter signal enciphering system, a teletypewriter permutation code signal enciphering transmitter, a teletypewriter receiver, a single transmission channel only interconnecting said transmitter and said receiver means in said transmitter for producing randomly occurring permutation code teletypewriter receiver stunt signal combinations, means in said transmitter for translating one of said stunt signal combinations into two other permutation code signal combinations, each of which other combinations is other than a stunt signal combination, means in said transmitter for introducing a permutation code teletypewriter receiver carriage return signal combination at times between said two other combinations, and means in said transmitter for transmitting said two other combinations and said carriage return signal combination from said transmitter directly over said single channel to said receiver.

13. In a permutation code teletypewriter signal enciphering system, a teletypewriter signal enciphering transmitter, means therein for producing randomly occurring permutation code teletypewriter receiver stunt signal combinations, means in said transmitter for translating one of said stunt signal combinations into two other permutation code signal combinations, each of which other combinations is other than a stunt combination, means in said transmitter for introducing a permutation code teletypewriter receiver line feed signal combination between said two other combinations, a teletypewriter receiver, a single transmission channel only interconnecting said transmitter and said receiver and means for transmitting said two other combinations and said line feed combination over said single channel from said transmitter to said receiver.

14. In a permutation code teletypewriter signal enciphering system, a teletypewriter enciphering signal transmitter, means in said transmitter for producing randomly occurring permutation code teletypewriter receiver stunt signal combinations, means in said transmitter for translating one of said signal combinations into two other permutation code signal combinations, each of which other signal combinations is other than a stunt signal combination, means in said transmitter for introducting a permutation code teletypewriter receiver carriage-return signal combination and a teletypewriter receiver line-feed signal combination between said two other combinations, a teletypewriter receiver, a single transmission channel interconnecting said transmitter and said receiver, and means for transmitting said two other signal combinations, said carriage return signal combination and said line feed signal combination from said transmitter directly over said single channel to said receiver.

15. In combination, in a permutation code teletypewriter signal enciphering system, means for producing randomly enciphered permutation code letter signal combinations, means for producing randomly enciphered permutation code receiving teletypewriter stunt signal combinations, means for translating said stunt signal combinations into permutation code signal combinations for particular letters, and means, responsive to the appearance of particular code combinations in said system, for automatically adjusting said system for transmitting permutation code signal combinations corresponding to plain text or for transmitting enciphered permutation code signal combinations.

16. In a permutation code teletypewriter signal enciphering and deciphering system, a permutation code signal teletypewriter enciphering transmitter, a permutation code signal teletypewriter receiving printer, a single signal transmission channel only interconnecting said transmitter and said printer directly, means in said printer for receiving trains of randomly enciphered permutation code signal combinations over said single channel from said transmitter, said combinations including sequences of enciphered permutation code signal combinations corresponding to both letter characters and teletypewriter receiving printer stunts and deciphering means coupled to said printer, responsive to said reception, for deciphering said trains into corresponding character combinations and teletypewriter receiving printer stunt combinations.

17. In a permutation code teletypewriter signal enciphering system, means for translating a symbol in a text into a permutation code signal combination, means for generating an enciphering permutation code signal combination, means for combining said combinations into an enciphered combination corresponding to a teletypewriter receiver stunt combination as distinguished from a character combination, means for translating said stunt combination into a definite combination other than said stunt combination, a transmitting distributor directly connected to said translating means and means for transferring said definite combination to said distributor for transmission.

18. An enciphering mechanism for enciphering permutation code teletypewriter signal combinations, said combinations including character combinations and stunt combinations, a single teletypewriter receiver only, a telegraph channel having two conductors only interconnecting said mechanism and said receiver, means in said mechanism for randomly enciphering said character combinations and said stunt combinations, means in said mechanism for producing character combinations and stunt combinations at random as a result of said enciphering, means in said mechanism for sensing said produced combinations, means in said mechanism for modifying said produced stunt combinations, before transmission to prevent their reception by said receiver at random, means in said mechanism for producing unenciphered stunt signals in an ordered sequence and means in said mechanism for transmitting said enciphered character combinations and said modified stunt combinations together with said unenciphered stunt signals in such sequence over said conductors to said teletypewriter receiver as to print a neat enciphered message on said receiver.

19. An enciphering system in accordance with claim 18 including means for controlling said mechanism so as to transmit unenciphered permutation code combinations in accordance with plain text at a first time and enciphered combinations, modified enciphered stunt combinations and unenciphered stunt combinations at a second time.

20. An enciphering system in accordance with claim 18 including means for controlling said mechanism so as to transmit plain text permutation code combinations or permutation code combinations conforming to a neat printed pattern of enciphered text.

21. In a telegraph system, a permutation code telegraph signal combination enciphering mechanism comprising a cipher unit at a first station, a single receiving page teletypewriter only, said teletypewriter at a second station, a single two-wire telegraph circuit connecting said unit and said teletypewriter, a plurality of sets of a plurality of permutatively adjustable cams in said unit, a plurality of sets of a plurality of gears controlling the positions of said cams in said sets, means for changing the positions of each of said gears in each of said sets individually with respect to each of the other gears in said sets to increase the number of permutation combinations of settings of said cams obtainable in sequence before repetition, a set of permutatively adjustable elements in said unit, means for combining the permutative settings of each of said sets of cams to control the permutative settings of said elements, a second set of permutatively adjustable elements in said unit, means for adjusting the positions of said second set of elements in accordance with permutation code combinations corresponding to characters and teletypewriter stunt combinations of a message text, means in said unit for modifying the settings of said second set of adjustable elements in accordance with the settings of said first set of elements to produce enciphered permutation code combinations corresponding to characters and stunts at random, means in said unit for identifying said random stunt combinations, means in said unit for modifying said random stunt combinations, means in said unit for producing unenciphered permutation code stunt combinations, means in said unit for arranging said permutation code enciphered combinations corresponding to characters and said modified stunt combinations and said unenciphered stunt combinations in an ordered sequence, means in said unit for impressing said ordered sequence of combinations directly on said two-wire circuit and means in said receiving page teletypewriter, responsive to the reception of said ordered sequence of combinations for printing an enciphered message, corresponding to said message text, in a neat pattern.

22. An enciphering system for enciphering permutation code teletypewriter signal combinations, corresponding to a message text, said combinations including character combinations and stunt combinations, said system having a mechanism for combining code signal combinations established at random with said character and stunt signal combinations to establish random enciphered permutation code signal combinations comprising both character and stunt combinations, a transmitting telegraph distributor connected directly to said mechanism, a single teletypewriter receiver only in said system, not more than two conductors interconnecting said distributor and said teletypewriter, means in said system responsive to the production of said random enciphered combinations for translating said random enciphered combinations into an ordered sequence of combinations, said ordered sequence of combinations comprising enciphered permutation code signal combinations, modified stunt signal combinations and unenciphered stunt signal combinations, means in said system responsive to said translation for impressing said ordered sequence of combinations directly on said distributor, means in said system for transmitting said ordered sequence of combinations from said distributor over said conductors directly to said receiver and means in said receiver, responsive to the reception of said ordered sequence of combinations, for controlling said printer so as to print an enciphered message, corresponding to said message text, in a neat pattern.

23. A permutation code teletypewriter signal enciphering system comprising a sending teletypewriter equipped with a perforator, means in said perforator for producing tape perforated with permutation code combinations corresponding to characters and receiving teletypewriter stunt combinations conforming to a message text, a cipher unit comprising an enciphering device and a rotary telegraph distributor coupled to said perforator through said tape, means in said device for producing essentially random permutation code enciphering combinations, means in said device for modifying said character combinations and said stunt combinations with said enciphering combinations to produce intermediate enciphered character combinations and intermediate enciphered stunt combinations essentially at random, means in said device for sensing said intermediate combinations, means in said device for modifying said random intermediate stunt combinations to prevent their transmission at random, means in said device for producing other teletypewriter stunt combinations in an ordered sequence, means in said device for producing ultimate enciphered character combinations, modified stunt combinations and ordered sequence stunt combinations in a particular preassigned pattern, a single two-conductor telegraph signal transmitting channel only, connecting said distributor to a single page teletypewriter printer only in said system, said printer at a distant office, means in said distributor for impressing said ordered pattern of combinations on said single two-conductor channel, and means in said printer, responsive to the reception of said ordered pattern of combinations for arranging enciphered printed characters corresponding to said message text in a neat pattern.

GEORGE A. LOCKE.